United States Patent
Liu et al.

(10) Patent No.: US 10,356,416 B2
(45) Date of Patent: Jul. 16, 2019

(54) SYSTEMS AND METHODS OF DETERMINING ILLUMINATION COMPENSATION STATUS FOR VIDEO CODING

(71) Applicant: QUALCOMM Incorporated, San Diego, CA (US)

(72) Inventors: Hongbin Liu, San Diego, CA (US); Ying Chen, San Diego, CA (US); Jianle Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 15/174,834

(22) Filed: Jun. 6, 2016

(65) Prior Publication Data
US 2016/0366416 A1     Dec. 15, 2016

Related U.S. Application Data

(60) Provisional application No. 62/173,234, filed on Jun. 9, 2015.

(51) Int. Cl.
*G06T 7/20*     (2017.01)
*G06T 7/246*    (2017.01)
(Continued)

(52) U.S. Cl.
CPC ............. *H04N 19/136* (2014.11); *G06T 7/20* (2013.01); *G06T 7/246* (2017.01); *G06T 7/248* (2017.01);
(Continued)

(58) Field of Classification Search
CPC combination set(s) only.
See application file for complete search history.

(56) References Cited

U.S. PATENT DOCUMENTS 9,924,191 B2 *   3/2018   Chen .................. H04N 19/82
2007/0177672 A1  8/2007   Yang et al.
(Continued)

FOREIGN PATENT DOCUMENTS

WO      2006033953 A1    3/2006

OTHER PUBLICATIONS

Liu, Hongbin et al., "3D-CE1/h related: Illumination Compensation for Inter-View Prediction", Input Document to Joint Collaborative Team on 3D Video Coding Extension Development of ITU-T SG 16 WP 3 and ISO/IEC JTC 1/SC 29/WG 11, 1st Meeting: Stockholm, SE, Jul. 16-20, 2012, JCT2-A0086 (Jul. 11, 2012).*
(Continued)

*Primary Examiner* — William C Vaughn, Jr.
*Assistant Examiner* — Lindsay J Uhl
(74) *Attorney, Agent, or Firm* — Polsinelli LLP

(57) ABSTRACT

Techniques and systems are provided for coding video data. For example, a method of coding video data includes determining motion information for a current block and determining an illumination compensation status for the current block. The method further includes coding the current block based on the motion information and the illumination compensation status for the current block. In some examples, the method further includes determining the motion information for the current block based on motion information of a candidate block. In such examples, the method further includes determining an illumination compensation status of the candidate block and deriving the
(Continued)

illumination compensation status for the current block based on the illumination compensation status of the candidate block.

68 Claims, 12 Drawing Sheets

(51) Int. Cl.
    *H04N 19/50*     (2014.01)
    *H04N 19/51*     (2014.01)
    *H04N 19/52*     (2014.01)
    *H04N 19/70*     (2014.01)
    *H04N 19/109*     (2014.01)
    *H04N 19/119*     (2014.01)
    *H04N 19/136*     (2014.01)
    *H04N 19/159*     (2014.01)
    *H04N 19/176*     (2014.01)
    *H04N 19/463*     (2014.01)
    *H04N 19/583*     (2014.01)

(52) U.S. Cl.
    CPC ......... *H04N 19/109* (2014.11); *H04N 19/119* (2014.11); *H04N 19/159* (2014.11); *H04N 19/176* (2014.11); *H04N 19/463* (2014.11); *H04N 19/50* (2014.11); *H04N 19/51* (2014.11); *H04N 19/52* (2014.11); *H04N 19/583* (2014.11); *H04N 19/70* (2014.11)

(56) References Cited

U.S. PATENT DOCUMENTS

| | | | |
|---|---|---|---|
| 2008/0304760 | A1 | 12/2008 | Lee et al. |
| 2010/0027881 | A1* | 2/2010 | Kim ..................... H04N 19/597 382/166 |
| 2011/0007800 | A1 | 1/2011 | Zheng et al. |
| 2014/0184740 | A1* | 7/2014 | Zhang ................... H04N 19/597 348/43 |
| 2016/0366415 | A1 | 12/2016 | Liu et al. |

OTHER PUBLICATIONS

An, Jicheng et al., "3D-CE3: Sub-PU level inter-view motion prediction", Input Document to Joint Collaborative Team on 3D Video Coding Extension Development of ITU-T SG 16 WP 3 and ISO/IEC JTC 1/SC 29/WG 11, 6th Meeting: Geneva, CH, Oct. 25-Nov. 1, 2013, JCT3V-F0110 (Mar. 27, 2013).*

Zhang, Kai et al., "3D-CE5.h: Removal of parsing dependency for illumination compensation", Input Document to Joint Collaborative Team on 3D Video Coding Extension Development of ITU-T SG 16 WP 3 and ISO/IEC JTC 1/SC 29/WG 11, 4th Meeting: Incheon, KR, Apr. 20-26, 2013, JCT3V-D152 (Mar. 27, 2013).*

Liu, Hongbin et al., "3D-CE2.h: Results of Illumination Compensation for Inter-View Prediction", Input Document to Joint Collaborative Team on 3D Video Coding Extension Development of ITU-T SG 16 WP 3 and ISO/IEC JTC 1/SC 29/WG 11, 2nd Meeting: Shanghai, CN, Oct. 13-19, 2012, JCT3V-B0045 (Oct. 11, 2012).*

An, Jicheng et al., "3D-CE3: Sub-PU level inter-view motion prediction", Input Document to Joint Collaborative Team on 3D Video Coding Extension Development of ITU-T SG16 WP3 and ISO/IEC JTC1/SC29/WG11, 6th Meeting: Geneva, CH, Oct. 25-Nov. 1, 2013, JCT3V-F0110 (Mar. 27, 2013) (Year: 2013).*

Liu, Hongbin et al., "3D-CE2.h: Results of Illumination Compensation for Inter-View Prediction", Input Document to Joint Collaborative Team on 3D Video Coding Extension Development of ITU-T SG16 WP3 and ISO/IEC JTC1/SC29/WG11, 2nd Meeting: Shanghai, CN, Oct. 13-19, 2012, JCT3V-B0045 (Oct. 11, 2012) (Year: 2012).*

Zhang, Kai et al., "3D-CE5.h: Removal of parsing dependency for illumination compensation", Input Document to Joint Collaborative Team on 3D Video Coding Extension Development of ITU-T SG 16 WP 3 and ISO/I EC JTC 1/SC 29/WG 11, 4th Meeting: Incheon, KR, Apr. 20-26, 2013, JCT3V-D152 (Mar. 27, 2013) (Year: 2013).*

An J., et al., "3D-CE3: Sub-PU Level Inter-View Motion Prediction", 6, JCT-3V Meeting, Oct. 25, 2013-Nov. 1, 2013, Geneva, (The Joint Collaborative Team on 3D Video Coding Extension Development of ISO/IEC JTC1/SC29/WG11 and ITU-T SG.16), URL: http://phenix.int-evry.fr/jct2/, No. JCT3V-F0110, Oct. 19, 2013 (Oct. 19, 2013), pp. 1-4, XP030131526.

Kimata H., et al., "Editors input on Joint Multiview Video Model (JMVM) 7.0", 26, JVT Meeting, 83, MPEG Meeting, Jan. 13, 2008-Jan. 18, 2008, Antalya, (Joint Video Team of ISO/IEC JTC1/SC29/WG11 and ITU-T SG.16), No. JVT-Z007, Jan. 11, 2008 (Jan. 11, 2008), pp. 1-16, XP030007306, ISSN: 0000-0136.

Liu H., et al., "CE1: Simplifications to Sub-PU Level Inter-view Motion Prediction," 7, JCT-3V Meeting; Jan. 11, 2014-Jan. 17, 2014; San Jose; (The Joint Collaborative Team on 3D Video Coding Extension Development of ISO/IEC JTC1/SC29/WG11 and ITU-T SG.16 ); URL: http://phenix.int-evry.fr/jct2/ No. JCT3V-G0120-v2, Jan. 8, 2014 (Jan. 8, 2014). XP030131894, 4 pages.

Liu H., et al., "Local Illumination Compensation", 52, VCEG Meeting, Jun. 19, 2015-Jun. 26, 2015, Warsaw, (Video Coding Experts Group of ITU-T SG.16), No. VCEG-AZ06, Jun. 18, 2015 (Jun. 18, 2015), 4 Pages, XP030003883.

Partial International Search Report—PCT/US2016/036162—ISA/EPO—dated Aug. 8, 2016.

Yang J-H., "CE5: Illumination Comp. Info. Derivation for MVC", 23, JVT Meeting, 80, MPEG Meeting, Apr. 21, 2007-Apr. 27, 2007, San Josa CR, US, (Joint Video Team of ISO/IEC JTC1/SC29/WG11 and ITU-T SG.16), No. JVT-W031, Apr. 25, 2007 (Apr. 25, 2007), pp. 1-8, XP030006991, ISSN: 0000-0155.

Zhang K., et al., "3D-CE5.h related: Removal of Parsing Dependency for Illumination Compensation", 4, JCT-3V Meeting, Apr. 20, 2013-Apr. 26, 2013, Incheon, (The Joint Collaborative Team on 3D Video Coding Extension Development of ISO/IEC JTC1/SC29/WG11 and ITU-T SG.16), URL: http://phenix.int-evry.fr/jct2/, No. JCT3V-D0152, Apr. 13, 2013 (Apr. 13, 2013), pp. 1-4, XP030130816, the whole document.

Chiu Y.J., et al., "Decoder-side Motion Estimation and Wiener filter for HEVC", 2013 Visual Communications and Image Processing (VCIP), IEEE, Nov. 17, 2013 (Nov. 17, 2013), pp. 1-6, XP032543658, DOI: 10.1109/VCIP.2013.6706446 [retrieved on Jan. 8, 2014].

ITU-T H.263 "Series H: Audiovisual and Multimedia Systems Infrastructure of audiovisual service-Coding of moving video: Video coding for low bitrate communication," (Jan. 2005), 226 pages.

Kamp S., et al., "Decoder-Side Motion Vector Derivation for Block-Based Video Coding", IEEE transactions on circuits and systems for video technology, vol. 22, No. 12, 2012, pp. 1732-1745.

Liu H., et al., "3D-CE1.h related: Illumination Compensation for Inter-View Prediction", 1. JCT-3V Meeting; 101. MPEG Meeting; Jul. 16, 2012-Jul. 20, 2012; Stockholm; (The Joint Collaborative Team on 3D Video Coding Extension Development of ISO/IEC JTC1/SC29/WG11 and ITU-T SG.16); URL: http://phenix.int-evry.fr/jct2/ No. JCT3V-A0086, pp. 1-7, Jul. 11, 2012 (Jul. 11, 2012), XP030130085.

Tech G., et al., "3D-HEVC Draft Text 7", Joint Collaborative Team on 3D Video Coding Extensions of ITU-T SG 16 WP 3 and ISO/IEC JTC 1/SC 29/WG 11(JCT-3V), Doc. JCT3V-K1001-v9, 11th Meeting: Geneva, Switzerland, Feb. 12-18, 2015, 101 pages.

Fujibavashi A., et al., "TE12: Performance of Partition Based Illumination Compensation (PBIC)", I JCT-VC Meeting, 94, MPEG Meeting, Oct. 7, 2010-Oct. 15, 2010, Guangzhou, (Joint Collaborative Team on Video Coding of ISO/IEC JTC1/SC29/WG11 and ITU-T SG.16), URL: http://wftp3.itu.int/av-arch/jctvc-site/, No. JCTVC-C041, Oct. 1, 2010 (Oct. 1, 2010), XP030007748.

Seo C-W., et al., "Pixel Based Illumination Compensation", 6. JCT-VC Meeting, 97, MPEG Meeting, Jul. 14, 2011-Jul. 22, 2011, Torino; (Joint Collaborative Team on Video Coding of ISO/IEC JTC1/SC29/WG11 and ITU-T SG.16), URL: http://wftp3.itu.int/av-arch/jctvc-site/, No. JCTVC-F417, Jul. 1, 2011 (Jul. 1, 2011), XP030009440, the whole document.

(56) References Cited

OTHER PUBLICATIONS

Alshina E., et al., "Performance of JEM 1.0 Tools Analysis", 2. JVET Meeting, Feb. 20, 2016-Feb. 26, 2016, San Diego, (The Joint Video Exploration Team of ISO/IEC JTC1/SC29/WG11 and ITU-T SG.16), URL: http://phenix.int-evry.fr/jvet/, No. JVET-B0022-v2, Feb. 17, 2016 (Feb. 17, 2016), pp. 1-28, XP030150010.

International Search Report and Written Opinion—PCT/US2016/036162—ISA/EPO—dated Oct. 6, 2016.

Li D-X., et al., "Optimising Inter-View Prediction Structure for Multiview Video Coding with Minimum Spanning Tree", Electronics Letters, IET Stevenage, GB, vol. 43, No. 23, Nov. 8, 2007 (Nov. 8, 2007), pp. 1269-1271, XP006029929, ISSN: 0013-5194, DOI: 10.1049/EL:20072465.

Liu H., et al., "3D-CE2.h: Results of Illumination Compensation for Inter-View Prediction", 2. JCT-3V Meeting, 102, MPEG Meeting, Oct. 13, 2012-Oct. 19, 2012, Shanghai, (The Joint Collaborative Team on 3D Video Coding Extension Development of ISO/IEC JTC1/SC29/WG11 and ITU-T SG.16), URL: http://phenix.int-evry.fr/jct2/, No. JCT3V-B0045, Oct. 9, 2012 (Oct. 9, 2012), pp. 1-5, XP030130226.

Qualcomm Incorporated, "Coding tools investigation for next generation video coding", ITU, Telecommunication Standardization Sector, COM 16—C 806—E, Jan. 2015, 7 Pages.

Chen Y-W., et al., "3D-CE4: On Complexity Reduction of Bi-Prediction for Illumination Compensation", Input Document to Joint W Collaborative Team on 3D Video Coding Extension Development of ITU-T SG 16 WP 3 and ISO/IEC JTC 1/SC 29/WG 11, 5th Meeting: Vienna, AT, Jul. 27-Aug. 2, 2013, pp. 1-3, JCT3V-E0168 (Jul. 19, 2013).

* cited by examiner

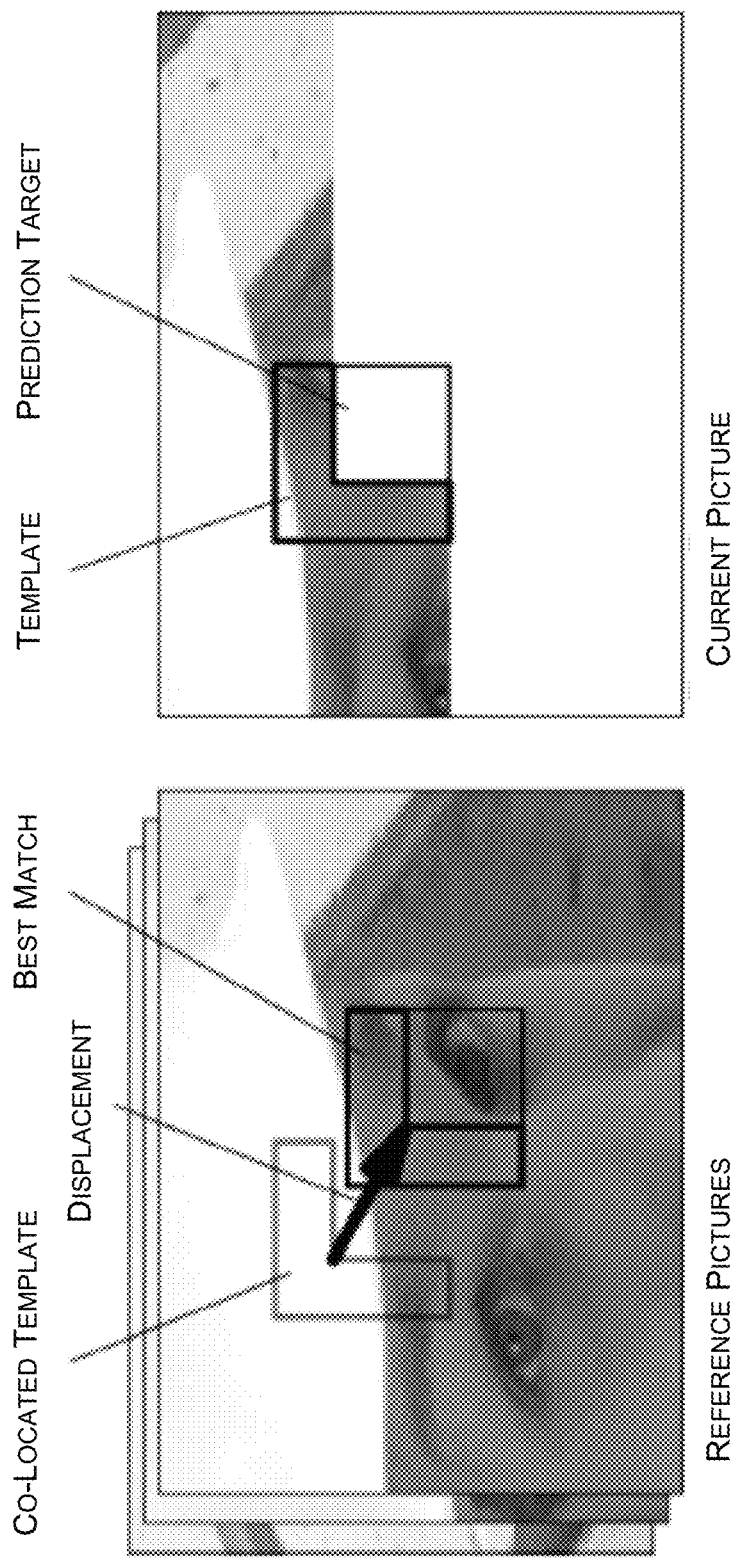

CURRENT CU    REFERENCE BLOCK

SYSTEMS AND METHODS OF DETERMINING ILLUMINATION COMPENSATION STATUS FOR VIDEO CODING

CROSS-REFERENCE TO RELATED APPLICATIONS

This application claims the benefit of U.S. Provisional Application No. 62/173,234, filed Jun. 9, 2015, which is hereby incorporated by reference, in its entirety. This application is related to U.S. application Ser. No. 15/174,820, titled "SYSTEMS AND METHODS OF DETERMINING ILLUMINATION COMPENSATION PARAMETERS FOR VIDEO CODING," filed on the same date herewith, which is hereby incorporated herein by reference, in its entirety.

FIELD

This disclosure relates generally to video coding. More specifically, this disclosure relates to systems and methods for performing illumination compensation for video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which for some techniques may also be referred to as coding tree blocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

BRIEF SUMMARY

In some embodiments, techniques and systems are described for deriving an illumination compensation status for video data. A video encoder can use illumination compensation to efficiently compensate variations in illumination between one or more pictures. The video encoder can determine one or more illumination compensation parameters for a coding block being encoded or for a coding unit, prediction unit, sub-prediction unit, or other coding block, coding unit, or prediction unit. Illumination compensation parameters can include an offset, one or more scaling factors, a shift number, or other suitable illumination compensation parameters. The illumination compensation parameters can be signaled in the bitstream or can be determined based on one or more of a reference block, a neighboring block, particular samples (e.g., pixels), or other information. A video decoder can utilize the illumination compensation parameters and/or other data to construct predictive data for decoding the current block.

An illumination compensation status can indicate whether illumination compensation has been used with respect to certain video data, such as a coding unit, prediction unit, sub-prediction unit, or other coding block, coding unit, or prediction unit. The illumination compensation status can include a flag or other indicator. In some examples, the illumination compensation status can be processed in a similar way as motion information so that the status can be derived or predicted together with motion information.

According to at least one example, a method of coding video data is provided that includes determining motion information for a current block. The method further includes determining an illumination compensation status for the current block. The method further includes coding the current block based on the motion information and the illumination compensation status for the current block.

In another example, an apparatus is provided that includes a memory configured to store video data and a processor. The processor is configured to and may determine motion information for a current block. The processor is further configured to and may determine an illumination compensation status for the current block. The processor is further configured to and may code the current block based on the motion information and the illumination compensation status for the current block.

In another example, a computer readable medium is provided having stored thereon instructions that when executed by a processor perform a method that includes: determining motion information for a current block; determining an illumination compensation status for the current block; and coding the current block based on the motion information and the illumination compensation status for the current block.

In another example, an apparatus is provided that includes means for determining motion information for a current block. The apparatus further includes means for determining an illumination compensation status for the current block.

The apparatus further includes means for coding the current block based on the motion information and the illumination compensation status for the current block.

In some aspects, the method, apparatuses, and computer readable medium described above may further include: determining the motion information for the current block based on motion information of a candidate block; determining an illumination compensation status of the candidate block; deriving the illumination compensation status for the current block based on the illumination compensation status of the candidate block; and coding the current block based on the motion information and the illumination compensation status for the current block.

In some aspects, the current block is coded using a merge mode, and the illumination compensation status for the current block is derived to be the same as the illumination compensation status of the candidate block.

In some aspects, the current block is coded using an inter prediction mode that copies or derives motion information from the candidate block, and wherein the illumination compensation status is derived to be the same as the illumination compensation status of the candidate block.

In some aspects, the candidate block is at least one or more of a spatial merge candidate, a temporal merge candidate, and a bi-predictive merge candidate.

In some aspects, the current block comprises a sub-prediction unit and a sub-prediction unit based merge mode is used, and wherein the illumination compensation status of the current block is based on a representative motion information generated from one or more temporal neighboring blocks of the current block.

In some aspects, the method, apparatuses, and computer readable medium described above may further include: determining a plurality of candidate blocks, including the candidate block; and pruning the plurality of candidates of repeat candidates, wherein any two candidates being associated with different illumination compensation statuses are not repeat candidates.

In some aspects, the method, apparatuses, and computer readable medium described above may further include adding a candidate to a merge list, the candidate having the same motion information as motion information of an existing candidate block and having a different illumination compensation status as an illumination compensation status of the existing candidate block.

In some aspects, the motion information of the current block is determined based on a plurality of candidate blocks including the candidate block, and wherein the illumination compensation status for the current block is based on a corresponding illumination compensation status of each of the plurality of candidate blocks.

In some aspects, the illumination compensation status for the current block is true only if the corresponding illumination compensation status of all of the plurality of candidate blocks is true.

In some aspects, the illumination compensation status for the current block is true if the corresponding illumination compensation status of any one of the plurality of candidate blocks is true.

In some aspects, the candidate block corresponds to a candidate in a first direction, and another candidate block of the plurality of candidate blocks corresponds to a candidate in a second direction different than the first direction, and wherein the illumination compensation status for the current block comprises a first illumination compensation status for the first direction based on the candidate block and a second illumination compensation status for the second direction based on the other candidate block.

In some aspects, the illumination compensation status for the current block is determined based on a type of inter-prediction mode used to determine the motion information for the current block.

In some aspects, the current block comprises a prediction unit coded using an inter-prediction mode other than a merge mode, and wherein the illumination compensation status for the current block is signaled for a coding unit comprising the current block.

In some aspects, the illumination compensation status for the current block is explicitly signaled in an encoded bitstream when the current block is coded using an AMVP mode.

In some aspects, the illumination compensation status for the current block is explicitly signaled in an encoded bitstream when the current block is coded using an inter prediction mode that signals the motion information of the current block explicitly in the encoded bitstream.

In some aspects, the illumination compensation status for the current block is also used as the illumination compensation status for a plurality of prediction units of the coding unit.

In some aspects, the plurality of prediction units comprises all prediction units of the coding unit.

In some aspects, the plurality of prediction units comprises a first set of prediction units coded using a merge mode and a second set of prediction units coded using an inter-prediction mode other than a merge mode, and wherein the illumination status signaled for the coding unit is used for the second set and not the first set.

In some aspects, the illumination compensation status is further based on a partition type of the coding unit.

In some aspects, the method, apparatuses, and computer readable medium described above may further include generating an additional prediction block based on the motion information of one or more neighboring blocks of the current block.

In some aspects, the method, apparatuses, and computer readable medium described above may further include deriving the illumination compensation status for generating the additional prediction block for the current block based on the motion information of the one or more neighboring blocks and the illumination compensation status of the current block.

In some aspects, additional motion information of the one or more neighboring blocks is determined to be not available for the current block when the one or more neighboring blocks of the current block have a different illumination compensation status than the current block.

In some aspects, the method, apparatuses, and computer readable medium described above may further include deriving one or more illumination compensation parameters for generating the additional prediction block based on one or more neighboring samples of the one or more neighboring blocks.

In some aspects, the method, apparatuses, and computer readable medium described above may further include selectively enabling weighted prediction for the current block based on the illumination compensation status for the current block.

In some aspects, the method, apparatuses, and computer readable medium described above may further include disabling weighted prediction for the current block when illumination compensation is used for the current block.

In some aspects, the method, apparatuses, and computer readable medium described above may further include selectively enabling illumination compensation for the current block based on whether weighted prediction is used for the current block.

In some aspects, the method, apparatuses, and computer readable medium described above may further include disabling the illumination compensation for the current block when weighted prediction is used for the current block.

In some aspects, the method, apparatuses, and computer readable medium described above may further include performing both illumination compensation and weighted prediction on the current block.

In some aspects, the method is executable on a wireless communication device. The wireless communication device comprises a memory configured to store the video data, a processor configured to execute instructions to process the video data stored in the memory, and a receiver configured to receive the encoded bitstream. In some aspects, the wireless communication device is a cellular telephone and the encoded video bitstream is modulated according to a cellular communication standard.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 7A and FIG. 7B are conceptual diagrams illustrating an example of template matching based decoder side motion vector derivation (DMVD).

DETAILED DESCRIPTION

Figure 1:
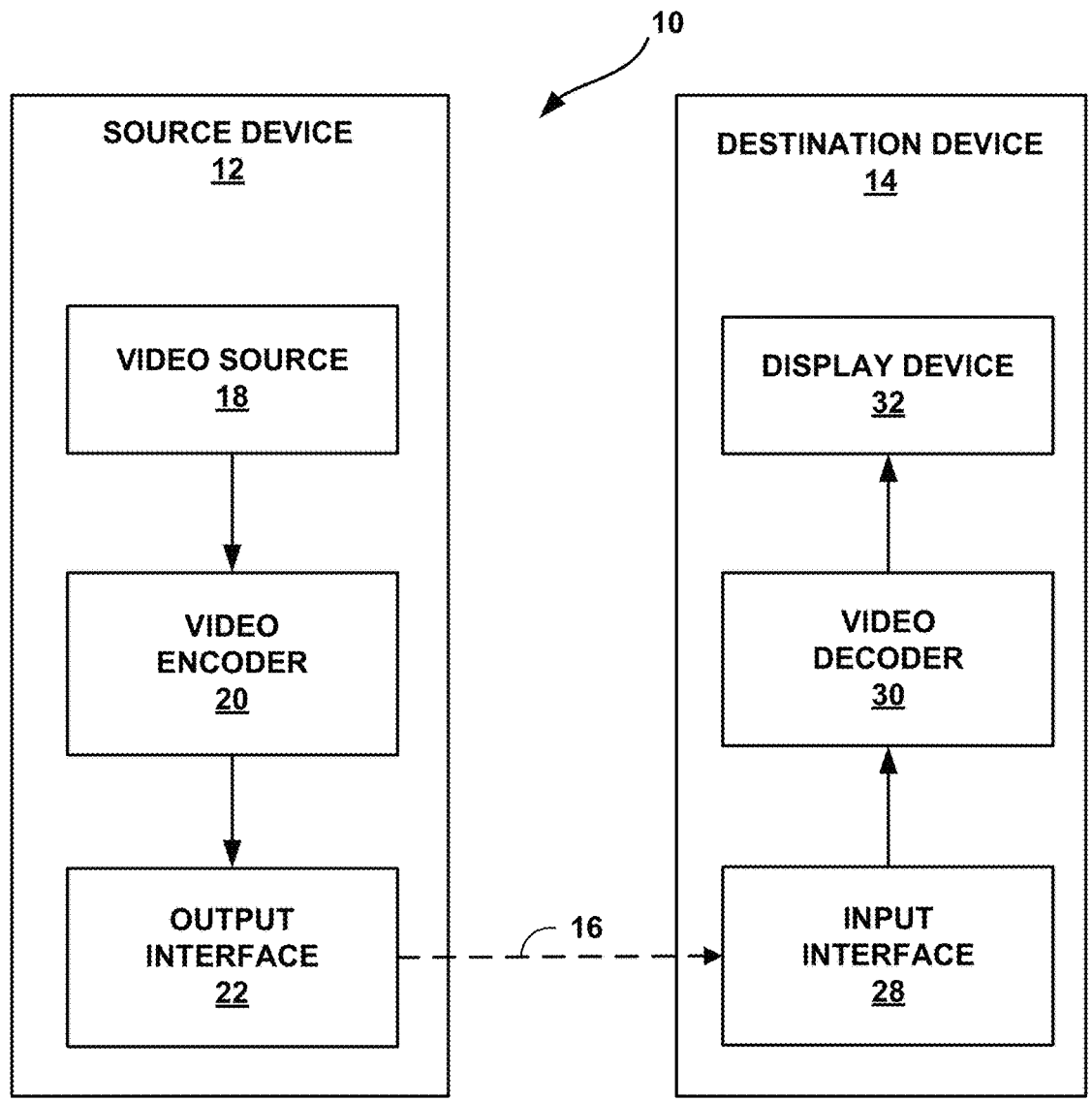
FIG. 1 is a block diagram illustrating an example video encoding and decoding system that may implement techniques of this disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Several systems and methods of video coding using video encoders and decoders are described herein. For example, one or more systems and methods of coding are directed to applying illumination compensation (IC) in block based video coding. The techniques can be applied to any of the existing video codecs (e.g., High Efficiency Video Coding (HEVC), Advanced Video Coding (AVC), or other suitable existing video codec), or can be an efficient coding tool for any future video coding standards.

Video coding devices implement video compression techniques to encode and decode video data efficiently. Video compression techniques may include applying spatial prediction (e.g., intra-frame prediction or intra-prediction), temporal prediction (e.g., inter-frame prediction or inter-prediction), and/or other prediction techniques to reduce or remove redundancy inherent in video sequences. A video encoder typically partitions each picture of an original video sequence into rectangular regions referred to as video blocks or coding units (described in greater detail below). These video blocks may be encoded using a particular prediction mode.

Video blocks may be divided in one or more ways into one or more groups of smaller blocks (e.g., coding tree blocks (CTB), prediction blocks (PB), transform blocks (TB)), each group individually representing the entire video block, as further described herein. Accordingly, references generally to blocks, unless otherwise specified, may refer to such video blocks (e.g., coding tree blocks (CTB), coding blocks, etc.), prediction blocks, transform blocks, or other appropriate blocks or sub-blocks, as would be understood by one of ordinary skill in the art. Further, each of these blocks may also interchangeably be referred to herein as "units" (e.g., coding tree unit (CTU), coding unit, prediction unit (PU), transform unit (TU), etc.). One of ordinary skill in the art will recognize that a unit may indicate a coding logical unit that is encoded in a bitstream, while a block may indicate a portion of video frame buffer a process is target to.

For inter-prediction modes, a video encoder typically searches for a block similar to the block being encoded in a frame located in another temporal location, referred to as a reference frame. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

In some instances, a video encoder can use illumination compensation (IC) to efficiently compensate variations in illumination (e.g., brightness) between one or more pictures. The video encoder can determine one or more IC parameters (e.g., offset, one or more scaling factors, shift number (may be fixed), or other suitable IC parameters) for the coding block being encoded or for a coding unit, prediction unit, sub-prediction unit, or other coding block, coding unit, or prediction unit. The IC parameters can be signaled in the bitstream or can be determined based on one or more of a reference block, a neighboring block, particular samples (e.g., pixels), or other information. The video encoder can include an indicator (e.g., one or more bits) and/or the IC parameters for the block being encoded in an encoded bitstream. The indicator can also be referred to as a flag. The indicator and/or the IC parameters can be encoded as part of the syntax elements in the encoded bitstream. The video decoder can utilize the flag, IC parameters, and/or other data to construct predictive data for decoding the current block.

According to aspects of this disclosure, a video coder (e.g., a video encoder or a video decoder) may derive IC parameters and/or signal whether a block uses IC when coding for a bitstream. For example, the video coder may insert IC information including at least one or more of an indication of how IC is used, an indication of the IC parameters used, the IC parameters themselves in the encoded bitstream, or any combination thereof. The video coder may further decode the encoded bitstream based on the IC information in the encoded bitstream.

FIG. 1 is a block diagram illustrating an example video encoding and decoding system 10 that can utilize techniques for deriving motion information, performing block partitioning, performing illumination compensation (IC), and/or perform other coding operations. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface 28. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for deriving motion information, performing block partitioning, and/or performing IC. In other examples, a source device and a destination device may include other components or arrangements. For example, source device 12 may receive video data from an external video source 18, such as an external camera. Likewise, destination device 14 may interface with an external display device 32, rather than including an integrated display device.

The illustrated system 10 of FIG. 1 is merely one example. Techniques for deriving motion information, performing block partitioning, and/or performing IC may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., Group of Pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data that can be used to decode the compressed (encoded) video data. Such communication may occur in real-time or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

Video encoder 20 and video decoder 30 may operate according to a video coding standard. Example video coding standards developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG) include High Efficiency Video Coding (HEVC) or ITU-T H.265, including its range extension, multiview extension (MV-HEVC) and scalable extension (SHVC). The finalized HEVC standard document is published as "ITU-T H.265, SERIES H: AUDIOVISUAL AND MULTIMEDIA SYSTEMS Infrastructure of audiovisual services—Coding of moving video—High efficiency video coding," Telecommunication Standardization Sector of International Telecommunication Union (ITU), April 2013. Alternatively, video encoder 20 and video decoder 30 may operate according to other proprietary or industry standards, such as ISO/IEC MPEG-4 Visual and ITU-T H.264 (also known as ISO/IEC MPEG-4 AVC), including its Scalable Video Coding (SVC) extension and Multiview Video Coding (MVC) extension. The techniques of this disclosure, however, are not limited to any particular coding standard. For example, the techniques of this disclosure may be used with a variety of other proprietary or non-proprietary video coding techniques or subsequent standards, such as ITU-T H.266.

As noted above, for inter-prediction modes, video encoder 20 may search for a block similar to the one being encoded (a "current block") in a picture of another temporal location, referred to as a reference picture. The information used to identify the reference picture may be referred to as motion information. For example, for each block, a set of motion information can be available. A set of motion information contains motion information for forward and backward prediction directions. Here, forward and backward prediction directions are two prediction directions of a bi-directional prediction mode. The terms "forward" and "backward" do not necessarily have a geometrical meaning, and may instead correspond to a reference picture list 0 (RefPicList0) and a reference picture list 1 (RefPicList1) of a current picture. When only one reference picture list is available for a picture or slice, only RefPicList0 is available and the motion information of each block of a slice can always be a forward prediction direction.

For each prediction direction, the motion information contains a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component.

In some cases, a motion vector together with its reference index is used in decoding processes. Such a motion vector with the associated reference index can be denoted as a uni-predictive set of motion information.

Picture order count (POC) is widely used in video coding standards to identify a display order of a picture. Although there can be cases in which two pictures within one coded video sequence may have the same POC value, it typically does not happen within a coded video sequence. When multiple coded video sequences are present in a bitstream, pictures with a same value of POC may be closer to each other in terms of decoding order. POC values of pictures can be used for reference picture list construction, derivation of reference picture set (e.g., as in HEVC), motion vector scaling, or other suitable uses.

In H.264/AVC, each inter macroblock (MB) may be partitioned four different ways, including: one 16×16 MB partition; two 16×8 MB partitions; two 8×16 MB partitions; and four 8×8 MB partitions. Different MB partitions in one MB may have different reference index values for each direction (RefPicList0 or RefPicList1). When a MB is not partitioned into four 8×8 MB partitions, the MB has only one motion vector for each MB partition in each direction. When an MB is partitioned into four 8×8 MB partitions, each 8×8 MB partition can be further partitioned into sub-blocks, each of which can have a different motion vector in each direction. There are four different ways to get sub-blocks from an 8×8 MB partition including: one 8×8 sub-block; two 8×4 sub-blocks; two 4×8 sub-blocks; and four 4×4 sub-blocks. Each sub-block can have a different motion vector in each direction. Therefore, a motion vector can be present in a level equal to or higher than a sub-block.

In H.264/AVC, a temporal direct mode can be enabled in either MB or MB partition level for skip or direct mode in B slices. For each MB partition, the motion vectors of the block co-located with the current MB partition in the RefPicList1[0] of the current block are used to derive the motion vectors. Each motion vector in the co-located block is scaled based on POC distances. In AVC, a direct mode can also predict motion information from the spatial neighbors, which may be referred to as a spatial direct mode.

In HEVC, to generate an encoded representation of a picture, video encoder 20 may generate a set of coding tree units (CTUs). A coding tree block (CTB) is the largest coding unit in a slice, and contains a quad-tree with coding units as nodes. For example, a CTU may comprise a CTB of luma samples, two corresponding CTBs of chroma samples, and syntax structures used to code the samples of the CTB. In monochrome pictures or pictures having three separate color planes, a CTU may comprise a single CTB block and syntax structures used to code the samples of the CTB.

A CTB may be an N×N block of samples. The size of a CTB can range from 16×16 to 64×64 in the HEVC main profile (although technically 8×8 CTB sizes can be supported). A coding unit (CU) can be the same size as a CTB, and as small as 8×8. Each CU is coded with one prediction mode. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the CTBs of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array. The CU may further include syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Figure 2:
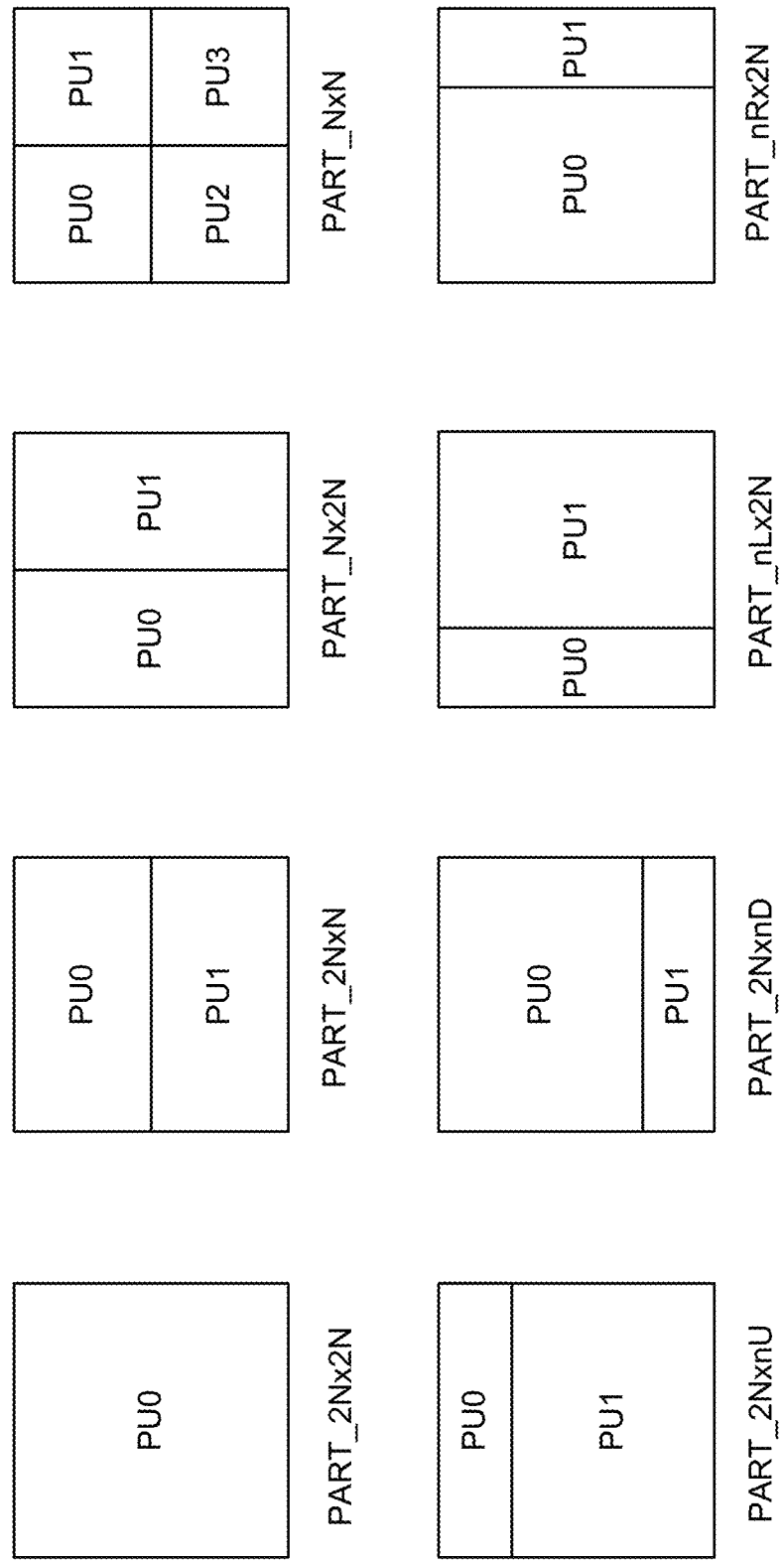
FIG. 2 is a block diagram illustrating examples of partition modes for coding units.

Video encoder 20 may use intra prediction or inter-prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter-prediction to generate the predictive blocks of a PU, video encoder 20 may generate the predictive blocks of the PU based on decoded samples of one or more pictures other than the picture associated with the PU. When a CU is inter-predicted (or inter-coded), the CU may be further partitioned into two or four PUs. In some cases, when a CU is inter-predicted, the CU can become just one PU when further partitioning does not apply. When two PUs are present in one CU, the two PUs may in some instances be half size rectangles or two rectangle sizes with one-fourth or three-quarters size of the CU. FIG. 2 is a block diagram illustrating examples of partition modes for CUs with inter-prediction mode. As shown, the partition modes include PART_2N×2N, PART_2N×N, PART_N×2N, PART_N×N, PART_2N×nU, PART_2N×nD, PART_nL×2N, and PART_nR×2N. A CU can be partitioned into PUs according to the different partition modes. Accordingly, a CU can be predicted using one or more of the partitioning modes.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

When a CU is inter-coded, one set of motion information is present for each PU. In addition, each PU is coded with a unique inter-prediction mode to derive a set of motion information. In the HEVC standard, there are two inter-prediction modes for a prediction unit (PU), including a merge mode and an advanced motion vector prediction (AMVP) mode. A skip prediction mode is considered as a special case of a merge prediction mode.

In either AMVP or merge mode, a motion vector (MV) candidate list is maintained for multiple motion vector predictors. The motion vector(s), as well as reference indices in the merge mode, of the current PU are generated by taking one candidate from the MV candidate list. In some examples, the MV candidate list contains up to five candidates for the merge mode and two candidates for the AMVP mode. One of ordinary skill in the art will appreciate that other numbers of candidates can be included in an MV candidate list for the merge or AMVP modes. A merge candidate may contain a set of motion information (e.g., motion vectors) corresponding to both reference picture lists (list 0 and list 1) and the reference indices. If a merge candidate is identified by a merge index, the reference pictures associated with the merge candidate are used for the prediction of the current blocks, and the associated motion vectors are determined. Under AMVP mode for each potential prediction direction from either list 0 or list 1, a reference index needs to be explicitly signaled, together with an MVP index to the MV candidate list because an AMVP candidate contains only a motion vector. In AMVP mode, the predicted motion vectors can be further refined. Accordingly, a merge candidate corresponds to a full set of motion information, while an AMVP candidate contains just one motion vector for a specific prediction direction and reference index. The candidates for both modes are derived similarly from the same spatial and/or temporal neighboring blocks, as described with respect to FIG. 5A, FIG. 5B, FIG. 6A, and FIG. 6B below.

According to aspects of this disclosure, as described in greater detail below, video encoder 20 and/or video decoder 30 may be configured to perform any combination of the techniques described herein for deriving motion information, performing block partitioning, and/or performing illumination compensation (IC).

Figure 3:
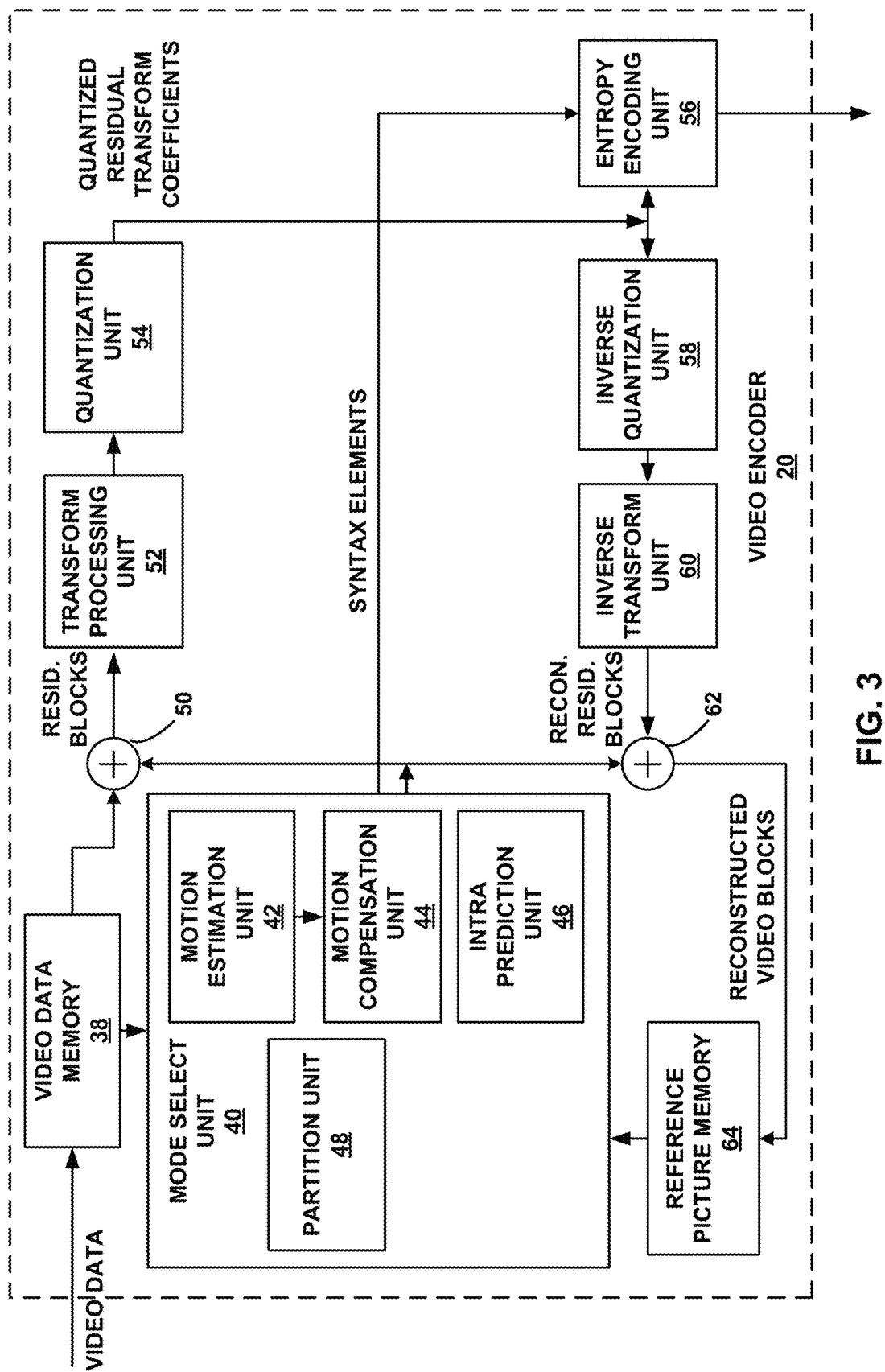
FIG. 3 is a block diagram illustrating an example of video encoder that may implement techniques of this disclosure.

FIG. 3 is a block diagram illustrating an example of video encoder 20 that may implement techniques for deriving motion information, performing block partitioning, and/or performing illumination compensation (IC). Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 3, video encoder 20 receives a current video block within a video frame to be encoded. In the example of FIG. 3, video encoder 20 includes video data memory 38, mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 3) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Video data memory 38 may store the video data to be encoded by the components of video encoder 20. The video data stored in video data memory 38 may be obtained, for example, from video source 18. Reference picture memory 64 may be referred to as a decoded picture buffer (DPB) that stores reference video data (e.g., reference pictures) for use in encoding video data by video encoder 20 (e.g., in intra- or inter-coding modes). Video data memory 38 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 38 and reference picture memory 64 may be provided by the same memory device or separate memory devices. In various examples, video data memory 38 may be on-chip with other components of video encoder 20, or off-chip relative to those components.

Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded in order to provide spatial prediction. Video encoder 20 may perform multiple coding passes (e.g., to select an appropriate coding mode for each block of video data).

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter (e.g., based on error results or other suitable factors), and may provide the resulting intra- or inter-coded block to summer 50 to generate residual block data and to summer 62 to reconstruct the encoded block for use as a reference picture or frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors. As further described herein, motion vectors estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded (in terms of pixel difference), which may be determined by sum of absolute difference (SAD), sum of square difference (SSD), sum of square error (SSE), sum of absolute transformed difference (SATD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In some examples, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

According to aspects of this disclosure, as described herein, video encoder 20 may be configured to perform any combination of the techniques described herein for performing illumination compensation (IC). In particular, certain techniques of this disclosure may be performed by motion estimation unit 42, motion compensation unit 44, and/or mode select unit 40. For example, IC parameters and/or IC status may be derived by the motion estimation unit 42 and/or the motion compensation unit 42. Further, mode select unit 40 may generate IC flags associated with video blocks, slices, pictures, sequences, etc. and may include them in the encoded bitstream for use by video decoder 30 in decoding the video blocks.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes (e.g., during separate encoding passes), and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data (received from mode select unit 40) from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding, or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, (e.g., for later use as a reference block). Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Figure 4:
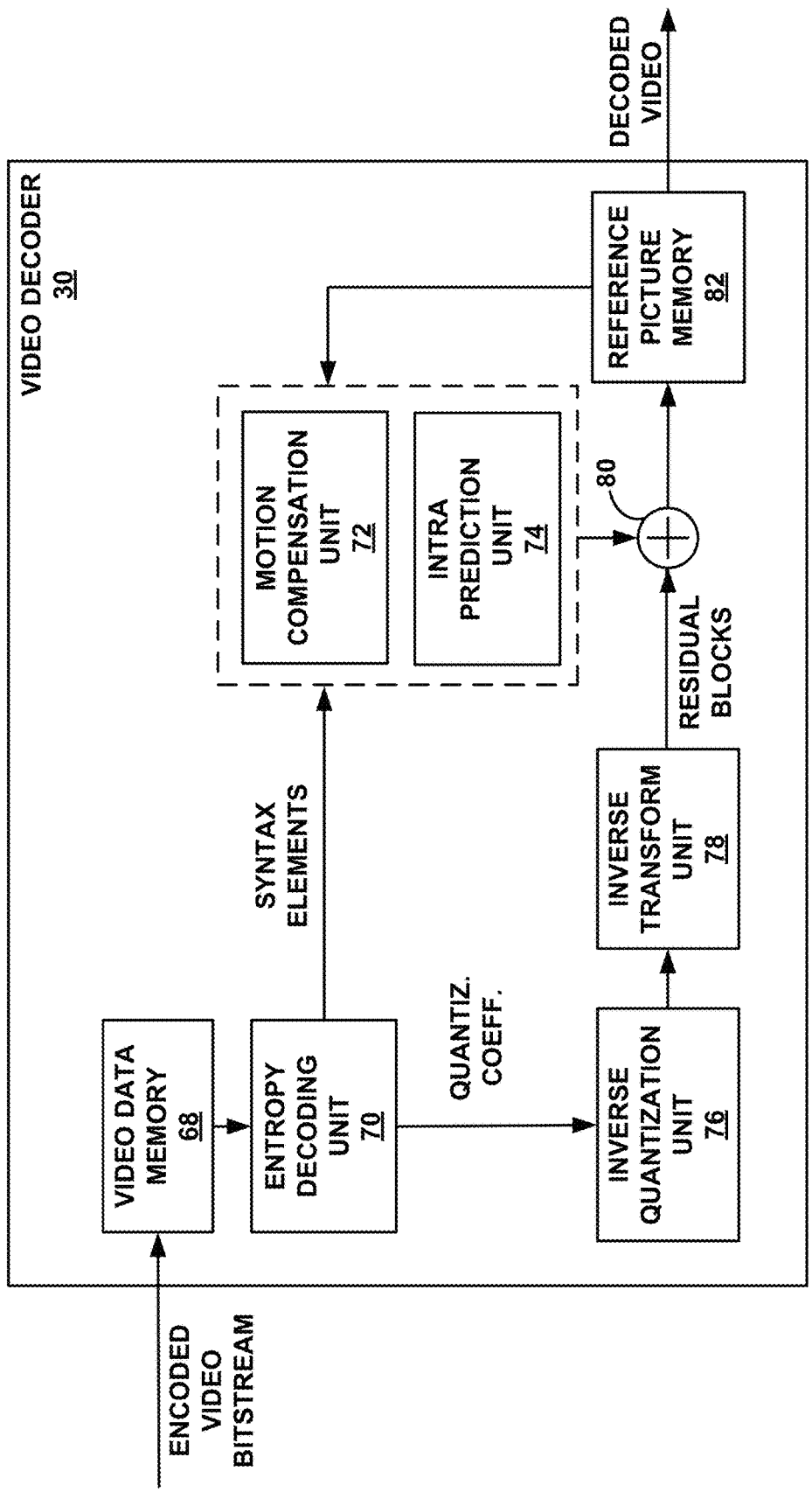
FIG. 4 is a block diagram illustrating an example of video decoder that may implement techniques of this disclosure.

FIG. 4 is a block diagram illustrating an example of video decoder 30 that may implement techniques for deriving motion information, performing block partitioning, and/or interpolating video data. In the example of FIG. 4, video decoder 30 includes video data memory 68, an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 3). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. The video data stored in video data memory 68 may be obtained, for example, from computer-readable medium, e.g., from a local video source, such as a camera, via wired or wireless network communication of video data, or by accessing physical data storage media. Video data memory 68 may form a coded picture buffer (CPB) that stores encoded video data from an encoded video bitstream. Reference picture memory 82 may be referred to as a DPB that stores reference video data for use in decoding video data by video decoder 30 (e.g., in intra- or inter-coding modes). Video data memory 68 and reference picture memory 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 68 and reference picture memory 82 may be provided by the same memory device or separate memory devices. In various examples, video data memory 68 may be on-chip with other components of video decoder 30, or off-chip relative to those components.

Entropy decoding unit 70 of video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When a video slice is coded as an intra-coded (I) slice, intra prediction unit 74 may generate prediction data for a video block of the current video slice based on a signaled intra-prediction mode and data from previously decoded blocks of the current frame or picture. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

According to aspects of this disclosure, video decoder 30 may be configured to perform any combination of the techniques described herein for performing illumination compensation (IC). In particular, motion compensation unit 72 may be configured to derive and/or apply IC status and/or IC parameters for predictive blocks.

Inverse quantization unit 76 inverse quantizes (or dequantizes) the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform (e.g., an inverse DCT, an inverse integer transform, or a conceptually similar inverse transform process) to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Figure 5B:
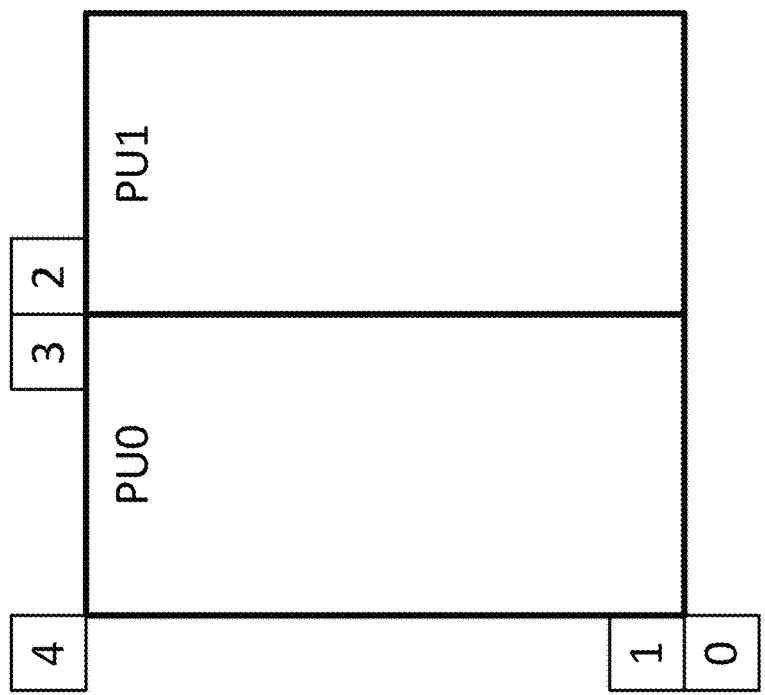
FIG. 5A and FIG. 5B are conceptual diagrams illustrating example spatial neighboring motion vector candidates for a merge mode and an advanced motion vector prediction (AMVP) mode.
Figure 5A:
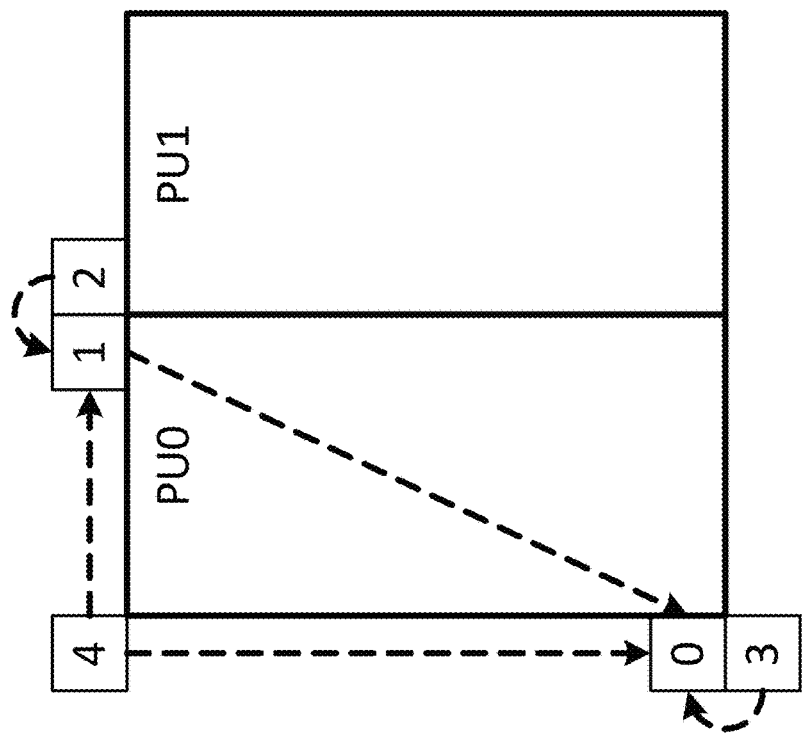

As previously described, two inter-prediction modes can be used for inter-prediction, including merge mode and AMVP mode. In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder. In some instances, for single direction inter-prediction of a PU, the encoder can generate a single AMVP candidate list. In some instances, for bi-directional prediction of a PU, the encoder can generate two AMVP candidate lists, one using motion data of spatial and temporal neighboring PUs from the forward prediction direction and one using motion data of spatial and temporal neighboring PUs from the backward prediction direction. The candidates for both modes can be derived from spatial and/or temporal neighboring blocks. For example, FIG. 5A and FIG. 5B include conceptual diagrams illustrating spatial neighboring candidates in HEVC. FIG. 5A illustrates spatial neighboring motion vector (MV) candidates for merge mode. FIG. 5B illustrates spatial neighboring motion vector (MV) candidates for AMVP mode. Spatial MV candidates are derived from the neighboring blocks for a specific PU (PU0), although the methods generating the candidates from the blocks differ for merge and AMVP modes.

In merge mode, the encoder can form a merging candidate list by considering merging candidates from various motion data positions. For example, as shown in FIG. 5A, up to four spatial MV candidates can be derived with respect spatially neighboring motion data positions shown with numbers 0-4 in FIG. 5A. The MV candidates can be ordered in the merging candidate list in the order shown by the numbers 0-4. For example, the positions and order can include: left position (0), above position (1), above right position (2), below left position (3), and above left position (4).

In AVMP mode shown in FIG. 5B, the neighboring blocks are divided into two groups: left group including the blocks 0 and 1, and above group including the blocks 2, 3, and 4. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

Figure 6B:
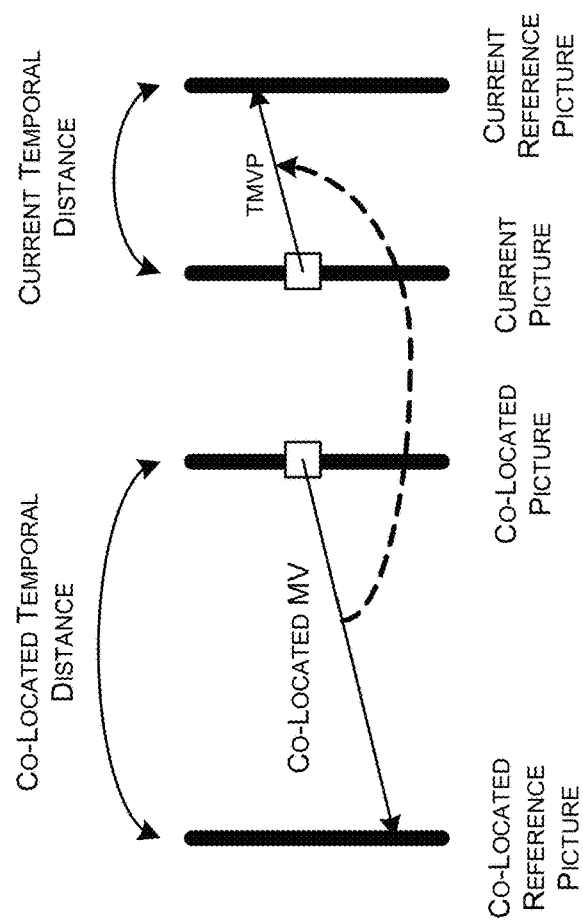
FIG. 6A and FIG. 6B are conceptual diagrams illustrating an example temporal motion vector predictor (TMVP) candidate and motion vector scaling.
Figure 6A:
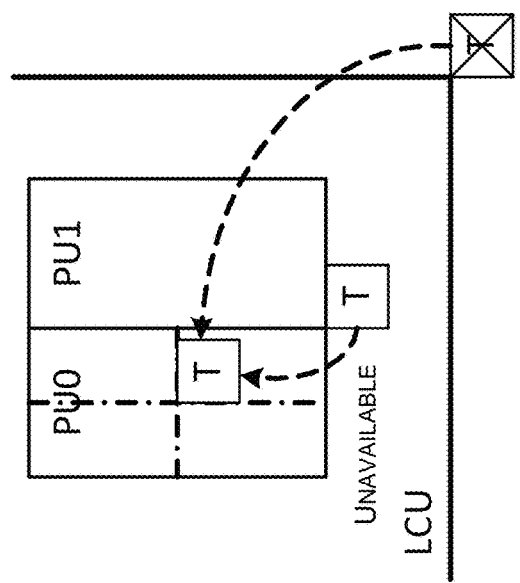

FIG. 6A and FIG. 6B include conceptual diagrams illustrating temporal motion vector prediction in HEVC. A temporal motion vector predictor (TMVP) candidate, if enabled and available, is added into a MV candidate list after spatial motion vector candidates. The process of motion vector derivation for a TMVP candidate is the same for both merge and AMVP modes. In some instances, however, the target reference index for the TMVP candidate in the merge mode can be set to zero.

The primary block location for TMVP candidate derivation is the bottom right block outside of the collocated PU, as shown in FIG. 6A as a block "T", to compensate for the bias to the above and left blocks used to generate spatial neighboring candidates. However, if that block is located outside of the current CTB (or LCU) row or motion information is not available, the block is substituted with a center block of the PU. A motion vector for a TMVP candidate is derived from the co-located PU of the co-located picture, indicated in the slice level. Similar to temporal direct mode in AVC, a motion vector of the TMVP candidate may be subject to motion vector scaling, which is performed to compensate for distance differences.

Other aspects of motion prediction are covered in the HEVC standard. For example, several other aspects of merge and AMVP modes are covered. One aspect includes motion vector scaling. It can be assumed that the value of motion vectors is proportional to the distance of pictures in the presentation time. A motion vector associates two pictures, the reference picture and the picture containing the motion vector (namely the containing picture). When a motion vector is utilized to predict the other motion vector, the distance of the containing picture and the reference picture is calculated based on the Picture Order Count (POC) values. For a motion vector to be predicted, both its associated containing picture and reference picture may be different. Therefore, a new distance (based on POC) is calculated, and the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Another aspect includes artificial motion vector candidate generation. For example, if a motion vector candidate list is not complete, artificial motion vector candidates can be generated and inserted at the end of the list until all candidates are obtained. In merge mode, there are two types of artificial MV candidates: combined candidate derived only for B-slices and zero candidates used only for AMVP if the first type does not provide enough artificial candidates. For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Another aspect of merge and AMVP modes includes a pruning process for candidate insertion. For example, candidates from different blocks may happen to be the same, which decreases the efficiency of a merge and/or an AMVP candidate list. A pruning process can be applied to solve this problem. The pruning process compares one candidate against the others in the current candidate list to avoid inserting identical candidate in certain extent. To reduce the complexity, only limited numbers of the pruning process can be applied instead of comparing each potential candidate with all the other existing candidates.

In some cases, a decoder can derive motion vectors. For example, with the advent of advanced video codecs, the bit percentage of motion information in bitstream has increased. To reduce the bit cost of motion information, decoder side motion vector derivation (DMVD) was proposed. FIG. 7A and FIG. 7B are conceptual diagrams illustrating an example of template matching based DMVD. Template matching based DMVD shows good coding efficiency improvement. With template matching based DMVD, instead of searching a best match for the prediction target, which is the current block at the decoder, a best match of a template is searched in the reference frame. Assuming the template and the prediction target are from the same object, the motion vector of the template can be used as the motion vector of the prediction target. Since the template matching is conducted at both the encoder and decoder, the motion vector can be derived at the decoder side to avoid signaling cost.

Figure 8:
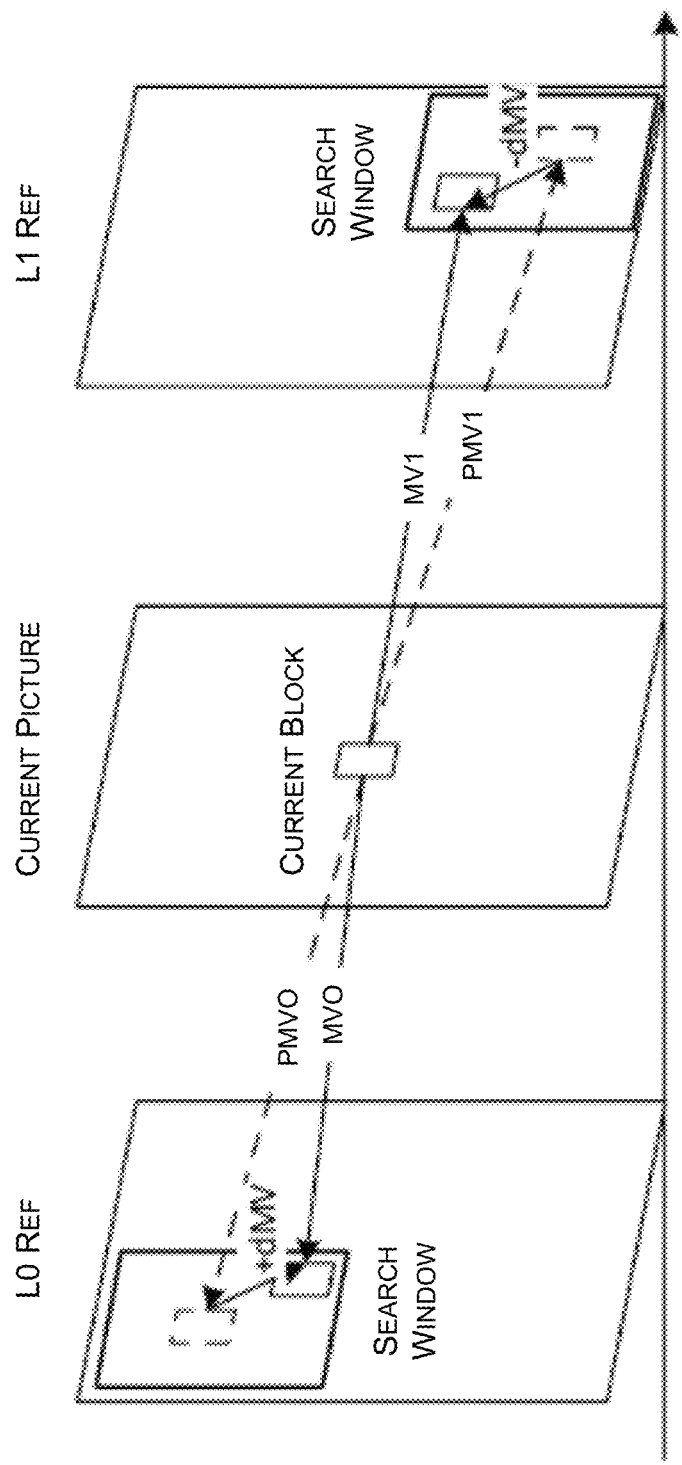
FIG. 8 is a conceptual diagram illustrating an example of mirror based bi-directional motion vector derivation in DMVD.

Another category of DMVD is mirror based bi-directional MV derivation. FIG. 8 is a conceptual diagram illustrating an example of mirror based bi-directional motion vector derivation in DMVD. Mirror based bi-directional MV derivation is similar to bilateral motion estimation in frame rate up-conversion. Mirror-based MV derivation is applied by centro symmetric motion estimation around search centers in fractional sample accuracy. The size and/or location of a search window may be pre-defined and may be signaled in bit stream. dMV in FIG. 8 is an offset which is added to PMV0 and is subtracted from PMV1 to generate a MV pair, MV0 and MV1.

All the values of dMV inside the search window will be checked and the Sum of Absolute Difference (SAD) between the L0 and L1 reference blocks is used as the measurement of Centro-symmetric motion estimation. The MV pair with the minimum SAD is selected as the output of Centro-symmetric motion estimation. Since the method needs a future reference (reference at a temporal position later than the current frame) and an earlier reference (reference at a temporal position earlier than the current frame) for the SAD matching, it cannot be applied to P frame or low-delay B frames in which only a former reference is available.

Figure 9:
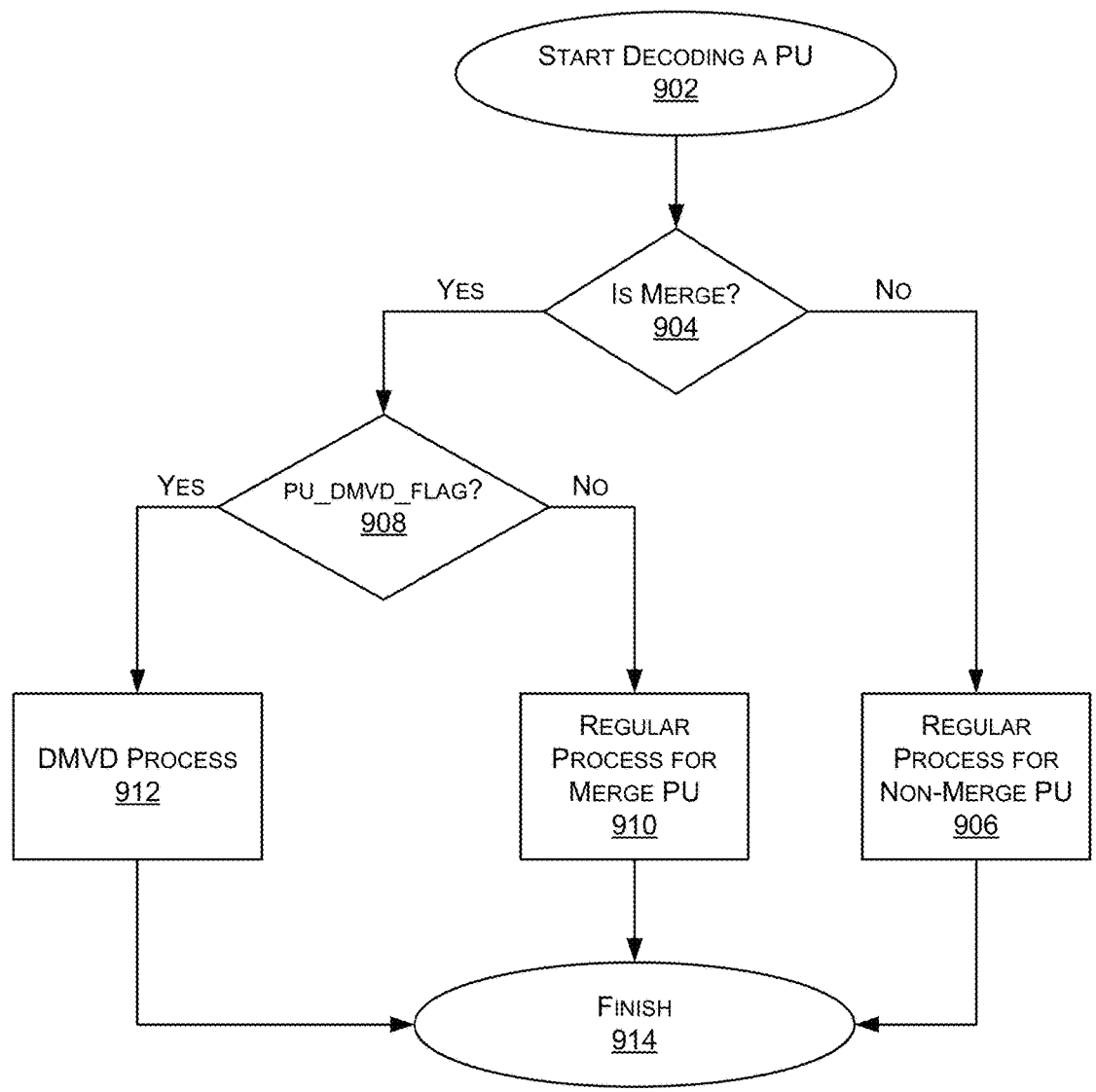
FIG. 9 is a flowchart illustrating an example of decoding a prediction unit (PU) using DMVD.

FIG. 9 is a flowchart illustrating an example of decoding a prediction unit (PU) using DMVD. It has been proposed to combine the mirror based bi-directional MV derivation with merge mode in HEVC. For example, a flag called pu_dmvd_flag can be added for a PU of B slices to indicate if DMVD mode is applied to the current PU. Since DMVD mode does not explicitly transmit any MV information in the bitstream, the decoding process of integrating pu_dmvd_flag with the syntax of merge mode in HEVC coding process is presented, as shown in FIG. 9.

For example, at 902, a decoder can start decoding a PU. At 904, the decoder can determine if a merge mode is enabled. If merge is not enabled, at 906, the decoder performs a regular process for non-merge PU. In the event merge is enabled, at 908, the decoder can determine whether a pu_dmvd_flag is present or includes a certain value (e.g., a 0 or 1) indicating DMVD mode is to be applied. If the pu_dmvd_flag is present or includes the value indicating DMVD mode is to be applied, the decoder performs the DMVD process at 912. Otherwise, the decoder can perform the regular merge process for a merge PU. The process finishes at 914.

Further, as noted above, a block/PU can be split into one or more (non-overlapped) sub-PUs or sub-blocks based on any motion derivation method. When a PU is split into multiple smaller sizes of sub-PUs, each sub-PU can have a unique set of motion information derived. For example a 32×32 PU can be split into 16 8×8 sub-PUs and each of the 8×8 sub-PU may have different reference indices and/or motion vectors. Such a size of the sub-PU can be even as small as 4×4, 2×2, or 1×1. Note that here the term PU is used interchangably with block and the term sub-PU is used interchangably with sub-block.

The size of the sub-block and/or sub-PU can be pre-defined and fixed regardless the size of the block and/or PU. Alternatively, a split depth D and a minimal sub-PU and/or sub-block size are predefined or signaled to indicate the target size of the sub-block or sub-PU to which the current block or PU shall be split into. The target size is the larger one between the minimal sub-PU or sub-block size and the size obtained by splitting the current block D times in a manner of quadtree.

For each sub-PU, searching of its unique motion information may include taking the motion information of the whole block as the search center (initial search point) and refining the motion for the sub-block. In some instances, the search center of each sub-PU may be derived from a list of starting point candidates.

Other characteristics also apply to sub-PUs and/or sub-blocks. For example, refinement of the motion vector can be applicable to sub-blocks one by one separately. Further, motion vector filtering may be performed for a sub-PU to correct isolated wrong motion vector. For instance, a median filter with a motion vector of a current sub-PU and motion vectors of (up to) four neighboring sub-PUs as input may be used. Also, when applying transform, the whole PU can be regarded as a whole block so that transform may cross sub-PU boundaries. In some instances, a transform is applied to each sub-PU such that transform size is no larger than sub-PU size.

Techniques and systems are described herein for performing illumination compensation (IC) in video coding. According to some embodiments, a video coder (e.g., a video encoder or a video decoder) may derive IC parameters or can signal the IC parameters in the bitstream and/or signal whether a block uses IC when being coded in a bitstream. For example, the video coder may insert IC information including at least one or more of an indication of how IC is used, an indication of the IC parameters used, the IC parameters themselves in the encoded bitstream, or any combination thereof. In some aspects, an IC status and/or IC parameters may be explicitly signaled individually for a block. For example, the IC status of a block indicates the block's status of being coded with IC or not. The IC status can be signaled in the encoded bitstream in which the block is sent. The video coder may further decode the encoded bitstream based on the IC information in the encoded bitstream. The techniques described herein can be applied individually, or any combination of the techniques described herein may be applied together.

In some embodiments, techniques and systems are described for deriving an IC status for video data. An IC status can indicate whether IC has been used on certain video data, such as a coding unit, prediction unit, sub-prediction unit, or other coding block, coding unit, or prediction unit. For simplicity, whether or not IC is used for a block is referred to herein as its IC status. For example, the IC status can include a flag or other indicator. However, in some embodiments, there may not be an explicit flag or indicator used for indication, but rather the status is derived based on certain information, such as motion information or other information as described herein. Whether and how IC is used for a picture or a portion of a picture (e.g., a block, slice, coding unit, PU, sub-PU, or the like) may be indicated in a plurality of different ways in the encoded bitstream, with each indicating a different manner in which IC is used for the picture or portion of the picture. Accordingly, techniques discussed herein may be able to handle local illumination variation, and may not require IC flags to be explicitly signaled in certain situations, thereby increasing coding efficiency.

The use of IC for a picture or portion of a picture (e.g., a block, such as a CU, PU, sub-PU, or the like) may be indicated in a number of different ways. Where IC is indicated as used for a certain picture or portion of a picture, IC parameters may be derived and/or indicated according to any of the appropriate techniques described herein or otherwise known.

In some embodiments, IC use for a picture or portion of a picture can be signaled based on motion information. In some aspects, when a block is encoded using an inter-prediction mode, whether or not IC is used for the block may be derived in a similar way that motion information is derived for the block, so that whether or not IC is used can be derived or predicted together with the motion information. In one example, where a current block (e.g., CU, PU, sub-PU, or the like) is coded using an inter-prediction mode (e.g., merge mode), the current block's status of being coded with IC or not is derived to be the same as that of the block where the motion information of the current block is derived from.

For example, the block (e.g., a merge candidate) from which the motion information is derived for the current block may have an explicit IC flag signaled (e.g., coded in the encoded bitstream), indicating a status of whether IC is used or not for the block. Accordingly, the IC status of the current block is also indicated by the same explicit flag of the block from which the motion information is derived, and an additional explicit flag is not needed for the current block. In some aspects, however, an explicit IC flag may be used for an individual block or collectively for a group of blocks (e.g., CU, group of CUs, slice, picture, sequence, etc.), and set to the derived value discussed herein.

For a block coded using merge mode, the merge index indicated for coding with the current block may indicate which spatial or temporal neighboring block the IC status is derived from, together with the motion information, without an explicit IC flag necessarily being needed for the current block. In some aspects, however, an explicit IC flag can be used for the current block with a value derived as discussed herein. For example, in some aspects, for spatial merge candidates, the IC status of the corresponding spatial neighboring block used to generate the merge candidate is inherited as the IC status of the spatial merge candidate.

In some aspects, for temporal merge candidates, the IC status of the corresponding temporal neighboring block used to generate the merge candidate is inherited as the IC status of the temporal merge candidate. In some aspects, for a bi-prediction temporal merge candidate, the temporal merge candidate may be generated based on more than one (e.g., two) different temporal neighboring blocks (e.g., one temporal neighboring block for each direction). In such aspects, the IC status of the temporal merge candidate may be set to true (or other value indicating IC is used) only if all (e.g., both) temporal neighboring blocks have an IC status of true, or else the IC status is set to false. In some cases, setting the IC status to true includes assigning a value of 1, and setting the IC status to false includes assigning a value of 0. In some cases, setting the IC status to true includes assigning a value of 0, and setting the IC status to false includes assigning a value of 1. In some cases, no value is set, and IC is assumed to be true for a block without assigning a value. In some alternative aspects, for bi-prediction temporal merge candidates, the IC status of the temporal merge candidate may be set to true (IC is used) if either of the temporal neighboring blocks have an IC status of true, or else the IC status is set to false. As another alternative, in such aspects, the IC status may be derived independently for each different direction based on each of the different temporal neighboring blocks used for prediction in each different direction. For example, if only one neighboring block in one direction uses IC, IC status may only be indicated as true for that particular direction. Therefore, IC may only be applied to that neighboring block in which direction the IC status is true.

In some aspects, for combined bi-predictive merge candidates, the merge candidate is generated from a combination of more than one (e.g., two) different already generated merge candidates (e.g., C0 and C1). In such aspects, the IC status of the combined bi-predictive merge candidate may be set to true only if already generated merge candidates (also referred to as "source merge candidates") (e.g., C0 and C1) have an IC status of true, or else the IC status is set to false. Alternatively, in such aspects, the IC status of the combined bi-predictive merge candidate may be set to true if either of the source merge candidates (e.g., C0 or C1) have an IC status of true, or else the IC status is set to false. As another alternative, in such aspects, the IC status may be derived independently for each of the different source merge candidates (e.g., C0 and C1). For example, if only one source merge candidate in one direction uses IC, IC status may only be derived as true for that particular merge candidate based on that source merge candidate. Therefore, IC may only be applied in one prediction direction and for the merge candidate based on the source merge candidate in the one direction that uses IC. In some other aspects, IC may be assumed as not used (i.e., IC status is false, disabled) for any combined bi-predictive merge candidate.

In some aspects, for a virtual uni-directional merge candidate (e.g., a merge candidate used to fill a merge candidate list for a uni-directional predicted block when neighboring blocks do not provide enough candidates), the IC is always disabled, and IC status is always assumed as false.

In some aspects, where a sub-PU based temporal prediction mode is used, representative motion information (e.g., prediction direction, and a reference index and motion vector in each prediction direction) is generated from the temporal neighboring block of a sub-PU for pruning sub-PU temporal merge candidates with other merge candidates. Accordingly, the IC status of the generated representative motion information is derived as equal to that of the corresponding temporal block from which the representative motion information is derived. Therefore, in some aspects, for every sub-PU, its IC status is derived from and equal to the IC status of the representative motion information. Alternatively, in some aspects, each sub-PU has its own IC status, and for each sub-PU, the IC status is derived as equal to that of the corresponding temporal block used for generating the temporal motion prediction of the sub-PU. In such aspects, where a sub-PU does not have any available temporal motion prediction, the IC status may be derived as equal to that of the representative motion information used for the sub-PU.

Alternatively, in some aspects, for any type of merge candidate, the IC status may always be derived and set as the same (e.g., either always true or always false).

In some aspects, for the pruning process for merge candidates described previously, if two merge candidates have different IC status, the two merge candidates can be considered as different merge candidates. Further, in some aspects, where the merge list is not complete, additional merge candidates may be inserted into the merge list that have the same motion information as already existing merge candidates (e.g., spatial/temporal merge candidates, sub-PU temporal merge candidates, combined bi-predictive merge candidates, zero merge candidates, etc.), but are set with a different IC flag value than the candidates in the merge list.

In some aspects, where a block is encoded using an inter-prediction mode other than merge mode (e.g., advanced motion vector prediction (AMVP) mode, decoder-side motion vector derivation (DMVD) mode, sub-PU-based DMVD mode, etc.), one IC flag can be explicitly signaled at the CU level.

In some aspects, the IC flag signaled at the CU level is used for any PU and/or sub-PU of the CU. In some examples, the IC flag may be explicitly signaled for each CU that is not coded with 2N×2N merge mode. Alternatively, or additionally, in some aspects, the IC flag signaled at the CU level may only be explicitly signaled at the CU level for CUs coded with a particular partition type (e.g., 2N×2N or other partition type described herein or known).

Alternatively, in some aspects, the IC flag signaled at the CU level is used only for PUs and/or sub-PUs of the CU that are not coded using merge mode. In such aspects, for PUs and/or sub-PUs coded using merge mode, the IC flag is derived from the corresponding neighboring block (e.g., spatial, temporal) as discussed herein. In some examples, the IC flag may only be explicitly signaled at the CU level for CUs in which at least one PU is encoded using an inter-prediction mode other than merge mode.

Alternatively, or additionally, in some aspects where a bi-prediction mode is used, a different IC flag is explicitly signaled for each prediction direction.

In some other aspects, where a block is encoded using an inter-prediction mode other than merge mode, one IC flag can be explicitly signaled at the PU level for each PU. In the case where the PU is bi-directionally predicted, in some aspects, a single IC flag may be used to indicate the IC status for both the forward and backward direction. In some other aspects, a different IC flag may be explicitly signaled for each prediction direction.

In some embodiments, IC use for a picture or portion of a picture can be signaled when using overlapped block motion compensation (OBMC). In OBMC, for a current block, besides its own motion vector (derived using an inter-prediction mode), the motion vectors of the above and left neighboring blocks may also be applied to generate two additional prediction blocks. Accordingly, each sample (e.g., pixel or group of pixels) in the current block may have three prediction values (based on the prediction block generated based on the motion vector of the current block, and the prediction blocks generated based on the motion vectors of the neighboring blocks). The final prediction values for each sample may be generated as a weighted average of the three prediction values.

Further in OBMC, when a neighboring block to the current block is not coded or coded using an intra-prediction mode, the neighboring block does not have a motion vector. In such situations, the motion vector of the current block may be used instead as the motion vector for generating the prediction block. In some aspects, OBMC may be performed at the CU, PU, or sub-PU level.

In some aspects, where OBMC is used for coding a current block, the IC flag of the current block may be used as the IC flag to be used to generate the additional prediction block using the MV of the neighboring block, and the IC parameters derived as discussed herein. In some other aspects, the IC flag of the corresponding neighboring blocks used to generate the additional prediction blocks may use its own IC flag. In some other aspects, the IC flag may be set as true only if all the IC flags of the additional prediction blocks are true. In another example, the IC flag may be set as true if at least one of the IC flags of the additional prediction blocks are true.

In some other aspects, additionally or alternatively, when a neighboring block has a different IC flag than the current block, the neighboring block may not be used to generate prediction blocks as part of OBMC. In some other aspects, OBMC may be disabled for any block with the IC flag set as true.

In some aspects, the neighboring samples of the current block or one of the neighboring blocks used to generate the additional prediction blocks may be used for deriving the IC parameters.

In some embodiments, weighted prediction (WP) may be used in motion compensation. For example, WP may include applying a scaling factor (a), a shift number (s), and an offset (b) to a sample value in motion compensation. In one example, supposing the sample value in position (x,y) of a reference picture is p(x, y), then the value p'(x,y) (the scaled, shifted, offset value of p(x,y), based on a, s, and b), may be used instead of p(x,y) as the prediction value for motion compensation. For example, $$p'(x,y)=((a*p(x,y)+(1<<(s-1)))>>s)+b$$

In some aspects, for each reference picture of a current slice, a flag is signaled to indicate whether WP applies for the reference picture or not. If WP applies of a reference picture, a set of WP parameters (e.g., a, s, and b) may be sent as part of the encoded bitstream to the decoder to be used for motion compensation from the reference picture. In some aspects, there may be separate flags and parameters for WP for luma and chroma components of the reference picture.

In some aspects, both IC and WP can be enabled (e.g., for a slice, picture, sequence, etc.). Alternatively, in some aspects, IC and WP are not to both be enabled. Accordingly, in such aspects, if IC is explicitly enabled, WP is disabled, or if IC is explicitly disabled, WP is enabled. Alternatively, in some aspects, WP is not enabled for a particular profile or not used at all.

In some aspects, when both IC and WP are enabled (e.g., for a slice, picture, sequence), for any given block (e.g., CU, PU, sub-PU), only IC or WP is enabled, but not both at the same time. In some aspects, IC status is signaled (or derived) regardless of whether WP is enabled or not for the reference pictures that the current block is predicted from. Accordingly, in some aspects, when the IC status of a block is true, only IC applies for the block, without consideration of whether WP is enabled or not for the reference pictures that the current block is predicted from. Further, in some aspects, when the IC status of a block is false, WP may only apply when the current block is predicted from one or more reference pictures where WP is enabled.

In some aspects, alternatively, when both IC and WP are enabled (e.g., for a slice, picture, sequence), IC may be used in addition to (e.g., on top of) WP when the current block is predicted from one or more reference pictures where WP is enabled, and the IC status of the current block is true. For example, WP may be first applied to the reference block and neighboring samples of the current block and the reference block. The samples processed with WP parameters may be referred to as modified samples. The IC parameters may then be derived based on the modified neighboring samples of the current block and the reference block, and are applied to the modified reference block for generating the prediction block.

In some aspects, alternatively, when both IC and WP are enabled (e.g., for a slice, picture, sequence), IC may only be used when WP is disabled for the one or more reference pictures that the current block is predicted from. For example, when a block is only predicted from reference frames with WP enabled, the IC status is not signaled (or copied form a neighboring block) and is always set as false for the block. Accordingly, the IC status can only be true (signaled or derived) when a block is predicted (or in some aspects partially predicted) from at least one reference picture with weighted prediction disabled.

Figure 11:
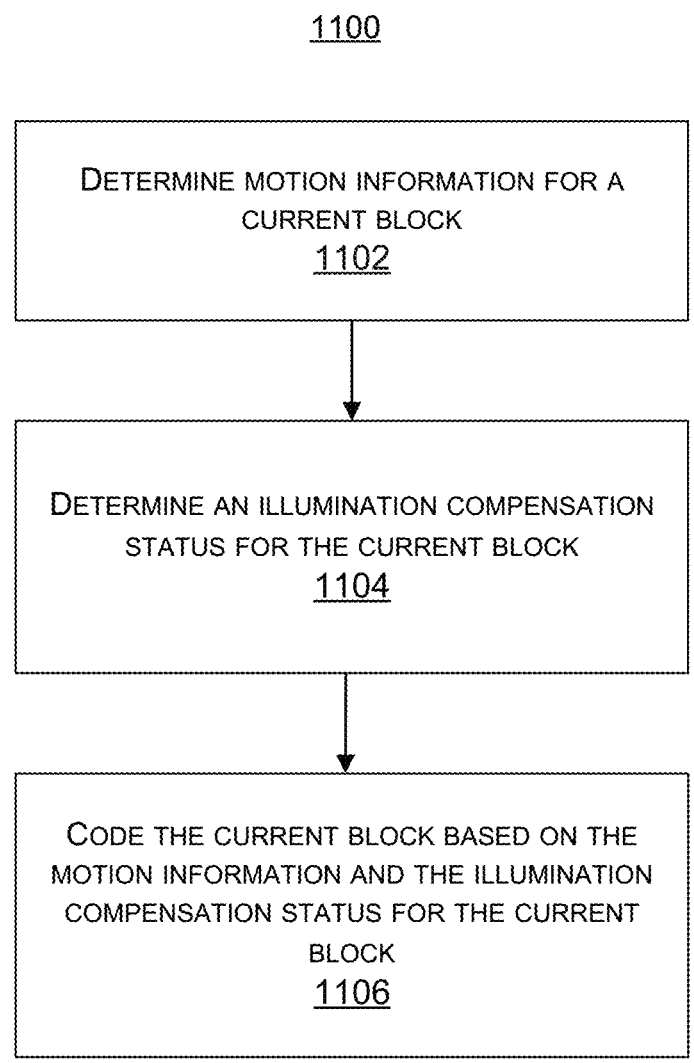
FIG. 11 is a flowchart illustrating an embodiment of a process of coding video data, in accordance with some embodiments.

FIG. 11 illustrates an embodiment of a process 1100 of coding video data. The process 1100 is implemented to determine an illumination compensation status for video data. In some aspects, the process 1100 may be performed by a computing device or an apparatus, such as the source device 12 or video encoder 20 shown in FIG. 1 or FIG. 3. For example, the computing device or apparatus may include an encoder, or a processor, microprocessor, microcomputer, or other component of an encoder that is configured to carry out the steps of process 1100. In some aspects, the process 1100 may be performed by a computing device or an apparatus, such as the destination device 14 or video decoder 30 shown in FIG. 1 or FIG. 4. For example, the computing device or apparatus may include a decoder, or a processor, microprocessor, microcomputer, or other component of a decoder that is configured to carry out the steps of process 1100.

Process 1100 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1100 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

At 1102, the process 1100 includes determining motion information for a current block. The candidate block can also be referred to as a merge candidate. As described herein, motion information can include one or more motion vectors and one or more reference indices. In some cases, the one or more motion vectors can correspond to one or more reference picture lists (e.g., list 0 and list 1). For example, a reference index can be used to identify a reference picture in the current reference picture list (list 0 or list 1). As described herein, one or more motion vectors and, in some cases, one or more reference indices (e.g., in merge mode), of a current block can be generated by taking a candidate from a candidate list.

At 1104, the process 1100 includes determining an illumination compensation status for the current block. For example, information corresponding to a candidate block can be used to derive the illumination compensation status for the current block, including whether illumination compensation is used for the current block. In some aspects, the process 1100 further includes determining the motion information for the current block based on motion information of a candidate block, determining an illumination compensation status of the candidate block, and deriving the illumination compensation status for the current block based on the illumination compensation status of the candidate block. Accordingly, an explicit illumination compensation flag is not needed to be signaled for the current block.

At 1106, the process 1100 includes coding the current block based on the motion information and the illumination compensation status for the current block. For example, if the illumination compensation status is derived to be true, indicating illumination compensation is used for the current block, the process 1100 can code the current block as part of an encoded bitstream using one or more illumination compensation parameters. Details regarding derivation of illumination compensation parameters are described below. In another example, if the illumination compensation status is derived to be false, indicating illumination compensation is not used for the current block, the process 1100 can code the current block as part of an encoded bitstream without using illumination compensation.

In some aspects, the current block is coded using a merge mode, and the illumination compensation status for the current block is derived to be the same as the illumination compensation status of the candidate block.

In some aspects, the current block is coded using an inter prediction mode that copies or derives motion information from the candidate block, and the illumination compensation status is derived to be the same as the illumination compensation status of the candidate block.

In some aspects, the candidate block is at least one or more of a spatial merge candidate, a temporal merge candidate, a bi-predictive merge candidate, or a combination thereof. In some examples, the motion information of the current block is determined based on a plurality of candidate blocks including the candidate block. In such examples, the illumination compensation status for the current block is based on a corresponding illumination compensation status of each of the plurality of candidate blocks. In some cases, the illumination compensation status for the current block is true only if the corresponding illumination compensation status of all of the plurality of candidate blocks is true. In some cases, the illumination compensation status for the current block is true if the corresponding illumination compensation status of any one of the plurality of candidate blocks is true.

In some examples, the candidate block corresponds to a candidate in a first direction, and another candidate block of the plurality of candidate blocks corresponds to a candidate in a second direction different than the first direction. In such examples, the illumination compensation status for the current block comprises a first illumination compensation status for the first direction based on the candidate block and a second illumination compensation status for the second direction based on the other candidate block.

In some aspects, the current block comprises a sub-prediction unit and a sub-prediction unit based merge mode is used. In such aspects, the illumination compensation status of the current block is based on a representative motion information generated from one or more temporal neighboring blocks of the current block.

In some aspects, the process 1100 includes determining a plurality of candidate blocks, including the candidate block, and pruning the plurality of candidates of repeat candidates. In such aspects, any two candidates being associated with different illumination compensation statuses are not repeat candidates.

In some aspects, the process 1100 includes adding a candidate to a merge list. The candidate added to the merge list has the same motion information as motion information of an existing candidate block and has a different illumination compensation status than an illumination compensation status of the existing candidate block.

In some aspects, the illumination compensation status for the current block is determined based on a type of inter-prediction mode used to determine the motion information for the current block. The inter-prediction mode can include a merge mode, an AMVP mode, or other suitable mode.

In some aspects, the current block comprises a prediction unit coded using an inter-prediction mode other than a merge mode. In such examples, the illumination compensation status for the current block is signaled for a coding unit comprising the current block. In some examples, the illumination compensation status for the current block is explicitly signaled in an encoded bitstream when the current block is coded using an AMVP mode. In some examples, the illumination compensation status for the current block is explicitly signaled in an encoded bitstream when the current block is coded using an inter prediction mode that signals the motion information of the current block explicitly in the encoded bitstream. In some examples, the illumination compensation status for the current block is also used as the illumination compensation status for a plurality of prediction units of the coding unit. In some cases, the plurality of prediction units comprises all prediction units of the coding unit. In some cases, the plurality of prediction units comprises a first set of prediction units coded using a merge mode and a second set of prediction units coded using an inter-prediction mode other than a merge mode. In such cases, the illumination status signaled for the coding unit is used for the second set and not the first set. In some aspects, the illumination compensation status is further based on a partition type of the coding unit.

In some aspects, the process 1100 includes generating an additional prediction block based on the motion information of one or more neighboring blocks of the current block. In some examples, the process 1100 includes deriving the illumination compensation status for generating the additional prediction block for the current block based on the motion information of the one or more neighboring blocks and the illumination compensation status of the current block. In some examples, additional motion information of the one or more neighboring blocks is determined to be not available for the current block when the one or more neighboring blocks of the current block have a different illumination compensation status than the current block. In some examples, the process 1100 includes deriving one or more illumination compensation parameters for generating the additional prediction block based on one or more neighboring samples of the one or more neighboring blocks.

In some aspects, the process 1100 includes selectively enabling weighted prediction for the current block based on the illumination compensation status for the current block. In some examples, the process 1100 includes disabling weighted prediction for the current block when illumination compensation is used for the current block.

In some aspects, the process 1100 includes selectively enabling illumination compensation for the current block based on whether weighted prediction is used for the current block. In some examples, the process 1100 includes disabling the illumination compensation for the current block when weighted prediction is used for the current block.

In some examples, the process 1100 includes performing both illumination compensation and weighted prediction on the current block.

As previously described, when IC is indicated as being used for a certain picture or portion of a picture, IC parameters can be derived. IC parameters can be derived using one or more different techniques described herein or otherwise known in the art. IC parameters can include one or more of a scaling factor, and offset, or a scaling factor and an offset, as described in more detail below. In some aspects, an IC model that can be used for inter prediction (e.g., prediction between different picture) is as follows:

$$p(i,j)=a*r(i+dv_x,j+dv_y+b), \text{ where } (i,j)\in PU_c \qquad (1)$$

Here, $PU_c$ is the current $PU_c$ (i, j) is the coordinate of pixels in $PU_c$, $(mv_x, mv_y)$ is the motion vector of $PU_c$. $p(i, j)$ is the prediction of $PU_c$, r is the PU's reference picture, and a and b are IC parameters of the linear IC model. For example, a is the scaling factor and b is the offset.

Figure 10A:
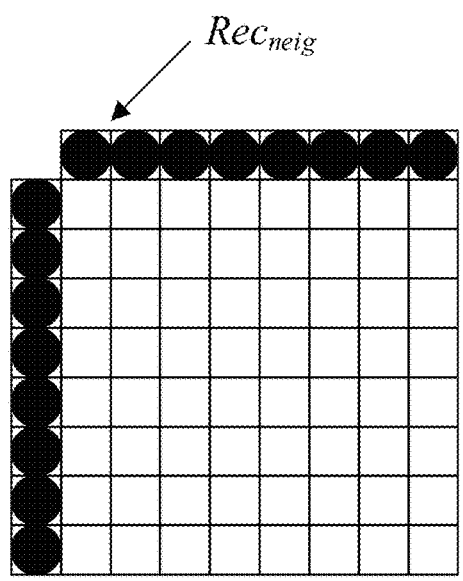
FIG. 10A and FIG. 10B are illustrations of the samples used for derivation of illumination compensation (IC) parameters for a current block.
Figure 10B:
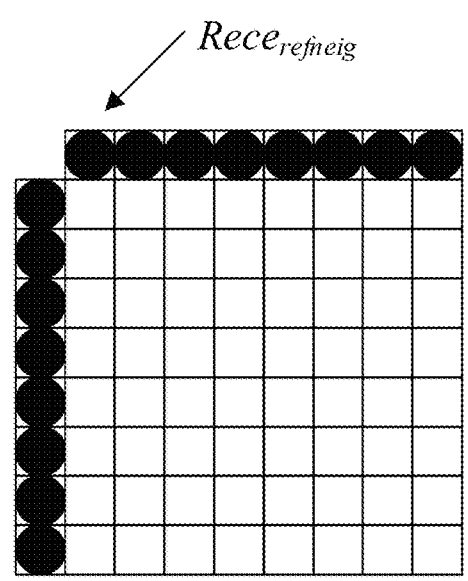

In some aspects, to estimate parameters a and b for a PU or other block, two sets of pixels are used. FIG. 10A and FIG. 10B show neighboring pixels used to estimate IC parameters. The two sets of pixels used to estimate IC parameters a and b for a PU are shown in FIG. 10A and FIG. 10B. The two sets of pixels include a first set including the available reconstructed neighboring pixels in left column and above row of the current CU (the CU that contains the current PU), and a second set including the corresponding neighboring pixels of the current CU's reference block. The reference block of current CU is found by using current PU's disparity vector (shown as ($mv_x$, $mv_y$) in equation 1). In some cases, the IC model of equation 1 can be used for local inter illumination variation.

To handle illumination variation on a more global scale (not only for local inter illumination variation), the IC parameters a and b can be calculated as:

$$a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneig}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2} \quad (2)$$

$$b = \frac{\sum_{i=0}^{2N-1} Rec_{neig}(i) - a \cdot \sum_{i=0}^{2N-1} Rec_{refneig}(i)}{2N} \quad (3)$$

Here, $Rec_{neig}$ and $Rec_{refneig}$ denote the used neighboring pixel set of the current CU and the neighboring pixel set of the current CU's reference block, respectively, and 2N denotes the pixel number in $Rec_{neig}$ and $Rec_{refneig}$.

In some examples, only a is used in a linear model and b is always set equal to 0. In some examples, only b is used and a is always set equal to 1. In some examples, both a and b are used.

In some aspects, IC parameters may be derived based on neighboring samples of a block. In some further aspects, additionally or alternatively, the IC parameters may be explicitly signaled (e.g., encoded in the bitstream) and/or inherited from neighboring blocks. In some such aspects, the manner in which the IC parameters are to be derived for a block may be explicitly signaled, such as using an index (e.g., at the block level). For example, when IC is determined as being used for a block (e.g., explicitly signaled or derived based on other information), a list of IC parameters may be generated and/or an index signaled in the encoded bitstream to indicate which IC parameter candidate is used for the current block. The list of IC parameter candidates may include one or more of the following: IC parameters derived by using neighboring samples, IC parameters of the neighboring blocks, IC parameters derived by using a subset of the neighboring blocks, or any combination thereof. In some aspects, the IC parameters selected from the list may be selected based on a measure (e.g., sum of absolute difference (SAD), sum of square error (SSE), sum of absolute transformed difference (SATD), a sum of square difference (SSD), or other suitable measure) based on the reconstructed block using IC and the actual block being coded.

In some aspects, the IC parameters and/or index may be signaled at the block level (e.g., CU, PU, sub-PU). In some aspects, additionally or alternatively, the IC parameters and/or index may be signaled at the slice-level and used for blocks wherein the spatial neighboring samples are not available.

In some aspects, IC may be signaled at one or more syntax levels (e.g., at the slice level, picture level, block level, or other suitable syntax level). For example, one or more IC flags may be included in one or more parameter sets (e.g., sequence parameter set, picture parameter set, or other headers or data structures associated with a particular syntax level) to indicate support of IC at the syntax level associated with the parameter set. For example, one IC flag may be used to indicate whether IC is enabled for the whole syntax level (e.g., slice). Additionally or alternatively, in some aspects, different IC flags may be used to separately indicate if IC is enabled for different components of the samples (e.g., one flag for luma, one flag for chroma) for the entire syntax level.

Additionally or alternatively, in some aspects, whether predictions should be made from a reference picture with our without IC may be indicated in the one or more parameter sets for the syntax level (e.g., slice, picture, block, or the like). For example, if a slice includes N reference pictures (or M pictures in the reference picture set (RPS) that can be used for the current picture), N (or M) syntax elements (e.g., one or more bits) can be signaled to indicate whether each of the reference pictures, when referred to by a specific block of the slice, can have IC enabled or not. Accordingly, at the block level, whether an IC flag should be explicitly present or not (e.g., like for AMVP mode which has a reference index signaled) may depend on the N (or M) syntax elements (bits) present, thus potentially avoiding additional signaling.

In some embodiments, illumination compensation (IC) use can be signaled when decoder side motion vector derivation (DMVD) is used. Further, when using DMVD mode (or in sub-PU based DMVD mode), the reliability of a candidate motion vector may be measured by the difference between two corresponding regions (e.g., regions that are similar) identified by the candidate motion vector. In some examples, the two corresponding regions can include a template in a current block and a template in a reference block or frame (e.g., in a template-based DMVD mode, as described with respect to FIG. 7A and FIG. 7B above). The difference can be determined using a sum of absolute difference (SAD), a sum of square difference (SSD), sum of square error (SSE), sum of absolute transformed difference (SATD), or other suitable difference measure. In some aspects, when the IC status of the current block (e.g., CU, PU, sub-PU) is true (indicating IC is used for the current block), the mean of the two corresponding regions may be removed first before calculating the difference between the two corresponding regions in order to measure the reliability of the candidate motion vector. In one example of calculating the mean of the two regions, for each block, the average luma, chroma, or other characteristic of each sample of the block is calculated and the average is subtracted from each sample. In such aspects, calculating the difference between the two corresponding regions may include performing a mean removed difference, such as a mean removed SAD, SSD, SSE, SATD, or other mean removed measure. Removing the mean of the two corresponding regions may partially eliminate the difference due to illumination differences between the corresponding regions that would be accounted for by IC. The IC parameters and/or IC status may then be signaled in the encoded bitstream.

In some aspects, alternatively, one of the corresponding regions may be considered the "current region" and the other corresponding region may be considered as a "reference region." IC parameters may be derived base on the neighboring samples of the current region and the reference region, and then applied to the reference region (creating an illumination compensated reference region). The difference between the current region and the illumination compensated reference region may then be used to measure the reliability of the candidate motion vector. The IC parameters and/or IC status may then be signaled in the encoded bitstream.

In some aspects, alternatively, IC may always be disabled for blocks coded with DMVD mode.

Figure 12:
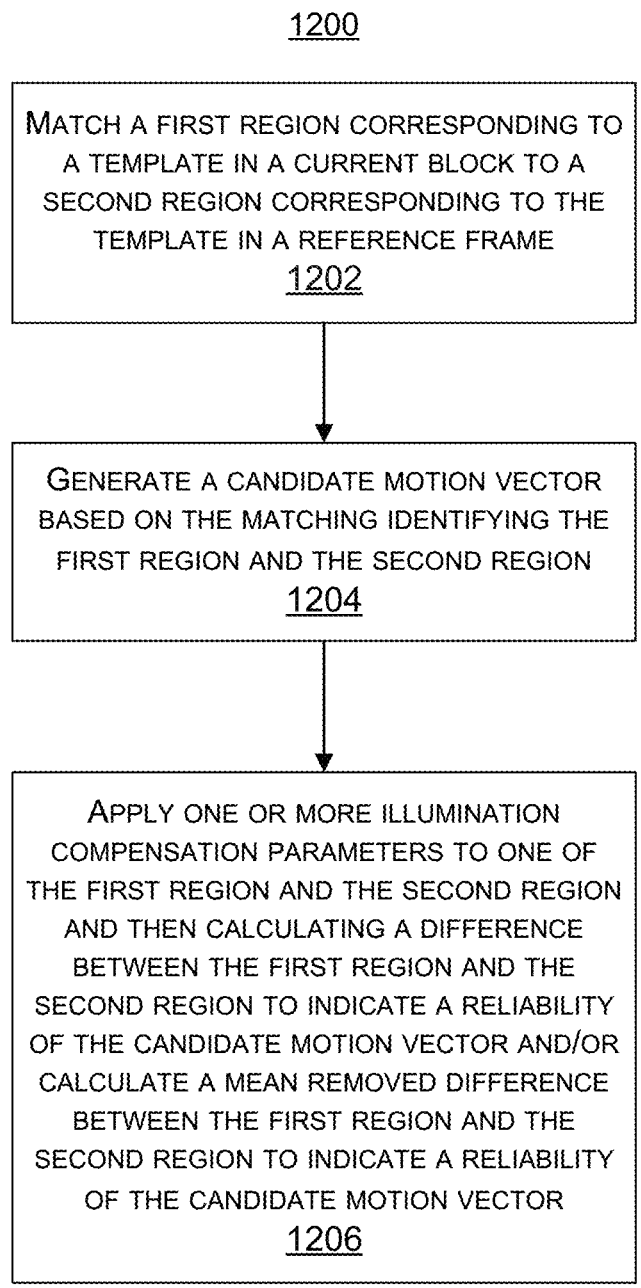
FIG. 12 is a flowchart illustrating an embodiment of a process of coding video data, in accordance with some embodiments.

FIG. 12 illustrates an embodiment of a process 1200 of coding video data. The process 1100 is implemented to measure the reliability of a candidate motion vector. In some aspects, the process 1200 may be performed by a computing device or an apparatus, such as the source device 12 or video encoder 20 shown in FIG. 1 or FIG. 3. For example, the computing device or apparatus may include an encoder, or a processor, microprocessor, microcomputer, or other component of an encoder that is configured to carry out the steps of process 1200. In some aspects, the process 1200 may be performed by a computing device or an apparatus, such as the destination device 14 or video decoder 30 shown in FIG. 1 or FIG. 4. For example, the computing device or apparatus may include a decoder, or a processor, microprocessor, microcomputer, or other component of a decoder that is configured to carry out the steps of process 1200.

Process 1200 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1200 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

At 1202, the process 1200 includes matching a first region corresponding to a template in a current block to a second region corresponding to the template in a reference frame. For example, a template matching based DMVD can be used to match the first region to the second region.

At 1204, the process 1200 includes generating a candidate motion vector based on the matching identifying the first region and the second region.

At 1206, the process 1200 includes at least one or more of: applying one or more illumination compensation parameters to one of the first region and the second region and then calculating a difference between the first region and the second region to indicate a reliability of the candidate motion vector; and calculating a mean removed difference between the first region and the second region to indicate a reliability of the candidate motion vector. As noted previously, removing the mean of the two corresponding regions may partially eliminate the difference due to illumination differences between the corresponding regions that would be accounted for by IC. The difference between the current region and the illumination compensated reference region may be used to measure the reliability of the candidate motion vector. The IC parameters and/or IC status may then be signaled in the encoded bitstream.

Hence, according to aspects of this disclosure, video encoder 20 or video decoder 30 may determine how to signal and apply illumination compensation to video blocks, or other portions of video. For example, video encoder 20 or video decoder 30 may determine IC parameters for video blocks based on neighboring samples. Further, video encoder 20 or video decoder 30 may determine the IC status of a block based on the motion information associated with a block and/or a type of inter-prediction mode (e.g., AVMP, DMVD, merge (e.g., types include spatial, temporal, bi-predictive, virtual uni-directional, etc.), OBMC, etc.) used. In yet another example, video encoder 20 or video decoder 30 may explicitly signal the use of IC for blocks encoded using an inter-prediction mode other than merge mode. In a further example, the video encoder 20 or video decoder 30 may indicate which of a plurality of IC parameters to use for a block. In another example, video encoder 20 or video decoder 30 may determine the reliability of a candidate motion vector based for DMVD based on the IC status of block. In yet further examples, the video encoder 20 or video decoder 30 may indicate IC status at the slice level, or a level associated with a parameter set. In further examples, the video encoder 20 or video decoder 30 may use IC in conjunction with WP.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   determining, by a coding device, a motion vector candidate list for a current block, wherein each candidate in the motion vector candidate list includes a set of motion information derived from a respective candidate block from a reference picture;
   selecting a particular candidate from the motion vector candidate list;
   determining an illumination compensation status for a candidate block associated with the particular candidate;
   coding the current block, wherein motion information for the current block is coded to refer to motion information for the candidate block, wherein an illumination compensation status for the current block is coded to refer to the illumination compensation status for the candidate block, and wherein coding the current block transforms video data associated with the current block from a first state to a second state; and
   selectively enabling weighted prediction for the current block based on the illumination compensation status for the current block, wherein weighted prediction is disabled for the current block in response to the illumination compensation status indicating illumination compensation is enabled for the current block.

2. The method of claim 1, further comprising:
   deriving the illumination compensation status for the current block based on the illumination compensation status of the candidate block.

3. The method of claim 2, wherein the current block is coded using a merge mode, and wherein the illumination compensation status for the current block is derived to be the same as the illumination compensation status of the candidate block.

4. The method of claim 2, wherein the current block is coded using an inter prediction mode that copies or derives motion information from the candidate block, and wherein the illumination compensation status for the current block is derived to be the same as the illumination compensation status of the candidate block.

5. The method of claim 1, wherein the candidate block is at least one or more of a spatial merge candidate, a temporal merge candidate, and a bi-predictive merge candidate.

6. The method of claim 1, wherein the current block comprises a sub-prediction unit, and further comprising:
using a sub-prediction unit based merge, wherein the illumination compensation status of the current block is based on a representative motion information generated from one or more temporal neighboring blocks of the current block.

7. The method of claim 1, further comprising:
determining a plurality of candidate blocks including the candidate block; and
pruning the plurality of candidate blocks of repeat candidate blocks, wherein any two candidate blocks associated with different illumination compensation statuses are not repeat candidate blocks.

8. The method of claim 1, further comprising adding a candidate to a merge list, the candidate having a same motion information as motion information of an existing candidate block and having a different illumination compensation status as an illumination compensation status of the existing candidate block.

9. The method of claim 1, wherein the motion information of the current block is determined based on a plurality of candidate blocks including the candidate block, and wherein the illumination compensation status for the current block is based on a corresponding illumination compensation status of each of the plurality of candidate blocks.

10. The method of claim 9, wherein the illumination compensation status for the current block is true only if the corresponding illumination compensation status of all of the plurality of candidate blocks is true.

11. The method of claim 9, wherein the illumination compensation status for the current block is true if the corresponding illumination compensation status of any one of the plurality of candidate blocks is true.

12. The method of claim 9, wherein the candidate block corresponds to a candidate in a first direction, where a second candidate block of the plurality of candidate blocks corresponds to a candidate in a second direction different than the first direction, and wherein the illumination compensation status for the current block comprises a first illumination compensation status for the first direction based on the candidate block and a second illumination compensation status for the second direction based on the second candidate block.

13. The method of claim 1, wherein the illumination compensation status for the current block is determined based on a type of inter-prediction mode used to determine the motion information for the current block.

14. The method of claim 1, wherein the current block comprises a prediction unit coded using an inter-prediction mode other than a merge mode, and wherein the illumination compensation status for the current block is signaled for a coding unit comprising the current block.

15. The method of claim 1, wherein the illumination compensation status for the current block is explicitly signaled in an encoded bitstream when the current block is coded using an Advanced Motion Vector Prediction (AMVP) mode.

16. The method of claim 1, wherein the illumination compensation status for the current block is explicitly signaled in an encoded bitstream when the current block is coded using an inter prediction mode that signals the motion information of the current block explicitly in the encoded bitstream.

17. The method of claim 1, wherein the illumination compensation status for the current block is also used as the illumination compensation status for a plurality of prediction units of a coding unit.

18. The method of claim 17, wherein the plurality of prediction units comprises all prediction units of the coding unit.

19. The method of claim 17, wherein the plurality of prediction units comprises a first set of prediction units coded using a merge mode and a second set of prediction units coded using an inter-prediction mode other than a merge mode, and wherein the illumination compensation status signaled for the coding unit is used for the second set and not the first set.

20. The method of claim 17, wherein the illumination compensation status is further based on a partition type of the coding unit.

21. The method of claim 1, further comprising generating an additional prediction block based on motion information of one or more neighboring blocks of the current block.

22. The method of claim 21, further comprising deriving the illumination compensation status for generating the additional prediction block based on the motion information of the one or more neighboring blocks and the illumination compensation status of the current block.

23. The method of claim 21, wherein additional motion information of the one or more neighboring blocks is determined to be not available for the current block when the one or more neighboring blocks of the current block have a different illumination compensation status than the current block.

24. The method of claim 21, further comprising deriving one or more illumination compensation parameters for generating the additional prediction block based on one or more neighboring samples of the one or more neighboring blocks.

25. The method of claim 1, further comprising selectively enabling weighted prediction for the current block based on whether weighted prediction is enabled for one or more reference pictures used to predict the current block.

26. The method of claim 1, further comprising disabling weighted prediction for the current block when illumination compensation is used for the current block.

27. The method of claim 1, further comprising selectively enabling illumination compensation for the current block based on whether weighted prediction is used for the current block.

28. The method of claim 27, further comprising disabling the illumination compensation for the current block when weighted prediction is used for the current block.

29. The method of claim 1, further comprising performing both illumination compensation and weighted prediction on the current block.

30. An apparatus comprising:
a memory configured to store video data; and
a processor configured to:
determine a motion vector candidate list for a current block, wherein each candidate in the motion vector candidate list includes a set of motion information derived form a respective candidate block from a reference picture;

select a particular candidate from the motion vector candidate list;

determine an illumination compensation status for a candidate block associated with the particular candidate;

code the current block, wherein motion information for the current block is coded to refer to motion information for the candidate block, wherein an illumination compensation status for the current block is coded to refer to the illumination compensation status for the candidate block, and wherein coding the current block transforms video data associated with the current block from a first state to a second state; and selectively enable weighted prediction for the current block based on the illumination compensation status for the current block, wherein weighted prediction is disabled for the current block in response to the illumination compensation status indicating illumination compensation is enabled for the current block.

31. The apparatus of claim 30, wherein the processor is further configured to:

derive the illumination compensation status for the current block based on the illumination compensation status of the candidate block.

32. The apparatus of claim 31, wherein the current block is coded using a merge mode, and the illumination compensation status for the current block is derived to be the same as the illumination compensation status of the candidate block.

33. The apparatus of claim 31, wherein the current block is coded using an inter prediction mode that copies or derives motion information from the candidate block, and wherein the illumination compensation status is derived to be the same as the illumination compensation status of the candidate block.

34. The apparatus of claim 30, wherein the candidate block is at least one or more of a spatial merge candidate, a temporal merge candidate, and a bi-predictive merge candidate.

35. The apparatus of claim 30, wherein the current block comprises a sub-prediction unit, and wherein the processor is further configured to:

use a sub-prediction unit based merge mode, wherein the illumination compensation status of the current block is based on a representative motion information generated from one or more temporal neighboring blocks of the current block.

36. The apparatus of claim 30, wherein the processor is further configured to:

determine a plurality of candidate blocks including the candidate block; and prune the plurality of candidate blocks of repeat candidate blocks, wherein any two candidate blocks associated with different illumination compensation statuses are not repeat candidate blocks.

37. The apparatus of claim 30, wherein the processor is further configured to add a candidate to a merge list, the candidate having a same motion information as motion information of an existing candidate block and having a different illumination compensation status as an illumination compensation status of the existing candidate block.

38. The apparatus of claim 30, wherein the motion information of the current block is determined based on a plurality of candidate blocks including the candidate block, and wherein the illumination compensation status for the current block is based on a corresponding illumination compensation status of each of the plurality of candidate blocks.

39. The apparatus of claim 38, wherein the illumination compensation status for the current block is true only if the corresponding illumination compensation status of all of the plurality of candidate blocks is true.

40. The apparatus of claim 38, wherein the illumination compensation status for the current block is true if the corresponding illumination compensation status of any one of the plurality of candidate blocks is true.

41. The apparatus of claim 38, wherein the candidate block corresponds to a candidate in a first direction, wherein a second candidate block of the plurality of candidate blocks corresponds to a candidate in a second direction different than the first direction, and wherein the illumination compensation status for the current block comprises a first illumination compensation status for the first direction based on the candidate block and a second illumination compensation status for the second direction based on the second candidate block.

42. The apparatus of claim 30, wherein the illumination compensation status for the current block is determined based on a type of inter-prediction mode used to determine the motion information for the current block.

43. The apparatus of claim 30, wherein the current block comprises a prediction unit coded using an inter-prediction mode other than a merge mode, and wherein the illumination compensation status for the current block is signaled for a coding unit comprising the current block.

44. The apparatus of claim 30, wherein the illumination compensation status for the current block is explicitly signaled in an encoded bitstream when the current block is coded using an Advanced Motion Vector Prediction (AMVP) mode.

45. The apparatus of claim 30, wherein the illumination compensation status for the current block is explicitly signaled in an encoded bitstream when the current block is coded using an inter prediction mode that signals the motion information of the current block explicitly in the encoded bitstream.

46. The apparatus of claim 30, wherein the illumination compensation status for the current block is also used as the illumination compensation status for a plurality of prediction units of a coding unit.

47. The apparatus of claim 46, wherein the plurality of prediction units comprises all prediction units of the coding unit.

48. The apparatus of claim 46, wherein the plurality of prediction units comprises a first set of prediction units coded using a merge mode and a second set of prediction units coded using an inter-prediction mode other than a merge mode, and wherein the illumination compensation status signaled for the coding unit is used for the second set and not the first set.

49. The apparatus of claim 46, wherein the illumination compensation status is further based on a partition type of the coding unit.

50. The apparatus of claim 30, wherein the processor is further configured to generate an additional prediction block based on motion information of one or more neighboring blocks of the current block.

51. The apparatus of claim 50, wherein the processor is further configured to derive the illumination compensation status for generating the additional prediction block based on the motion information of the one or more neighboring blocks and the illumination compensation status of the current block.

52. The apparatus of claim 50, wherein additional motion information of the one or more neighboring blocks is determined to be not available for the current block when the one or more neighboring blocks of the current block have a different illumination compensation status than the current block.

53. The apparatus of claim 50, wherein the processor is further configured to derive one or more illumination compensation parameters for generating the additional prediction block based on one or more neighboring samples of the one or more neighboring blocks.

54. The apparatus of claim 30, wherein the processor is further configured to selectively enable weighted prediction for the current block based on whether weighted prediction is enabled for one or more reference pictures used to predict the current block.

55. The apparatus of claim 30, wherein the processor is further configured to disable weighted prediction for the current block when illumination compensation is used for the current block.

56. The apparatus of claim 30, wherein the processor is further configured to selectively enable illumination compensation for the current block based on whether weighted prediction is used for the current block.

57. The apparatus of claim 56, wherein the processor is further configured to disable the illumination compensation for the current block when weighted prediction is used for the current block.

58. The apparatus of claim 30, wherein the processor is further configured to perform both illumination compensation and weighted prediction on the current block.

59. A non-transitory computer readable medium having stored thereon instructions that when executed by a processor cause the processor to perform operations, including:
    determining a motion vector candidate list for a current block, wherein each candidate in the motion vector candidate list includes a set of motion information derived from a respective candidate block from a reference picture;
    selecting a particular candidate from the motion vector candidate list;
    determining an illumination compensation status for a candidate block associated with the particular candidate;
    coding the current block, wherein motion information for the current block is coded to refer to motion information for the candidate block, wherein an illumination compensation status for the current block is coded to refer to the illumination compensation status for the candidate block, and wherein coding the current block transforms video data associated with the current block from a first state to a second state; and
    selectively enabling weighted prediction for the current block based on the illumination compensation status for the current block, wherein weighted prediction is disabled for the current block in response to the illumination compensation status indicating illumination compensation is enabled for the current block.

60. The non-transitory computer readable medium of claim 59, further comprising instructions that when executed by a processor cause the processor to perform operations including:
    deriving the illumination compensation status for the current block based on the illumination compensation status of the candidate block.

61. The non-transitory computer readable medium of claim 60, wherein the current block is coded using a merge mode, and the illumination compensation status for the current block is derived to be the same as the illumination compensation status of the candidate block.

62. The non-transitory computer readable medium of claim 60, wherein the current block is coded using an inter prediction mode that copies or derives motion information from the candidate block, and wherein the illumination compensation status is derived to be the same as the illumination compensation status of the candidate block.

63. The non-transitory computer readable medium of claim 59, wherein the candidate block is at least one or more of a spatial merge candidate, a temporal merge candidate, and a bi-predictive merge candidate.

64. An apparatus comprising:
    means for determining a motion vector candidate list for a current block, wherein each candidate in the motion vector candidate list includes a set of motion information derived from a respective candidate block from a reference picture;
    means for selecting a particular candidate from the motion vector candidate list;
    means for determining an illumination compensation status for a candidate block associated with the particular candidate;
    means for coding the current block, wherein motion information for the current block is coded to refer to motion information for the candidate block, wherein an illumination compensation status for the current block is coded to refer to the illumination compensation status for the candidate block, and wherein coding the current block transforms video data associated with the current block from a first state to a second state; and
    means for selectively enabling weighted prediction for the current block based on the illumination compensation status for the current block, wherein weighted prediction is disabled for the current block in response to the illumination compensation status indicating illumination compensation is enabled for the current block.

65. The apparatus of claim 64, further comprising:
    means for deriving the illumination compensation status for the current block based on the illumination compensation status of the candidate block.

66. The apparatus of claim 65, wherein the current block is coded using a merge mode, and the illumination compensation status for the current block is derived to be the same as the illumination compensation status of the candidate block.

67. The apparatus of claim 65, wherein the current block is coded using an inter prediction mode that copies or derives motion information from the candidate block, and wherein the illumination compensation status is derived to be the same as the illumination compensation status of the candidate block.

68. The apparatus of claim 64, wherein the candidate block is at least one or more of a spatial merge candidate, a temporal merge candidate, and a bi-predictive merge candidate.

* * * * *